(12) United States Patent
Chu et al.

(10) Patent No.: US 10,306,603 B1
(45) Date of Patent: May 28, 2019

(54) RESOURCE REQUEST FOR UPLINK MULTI-USER TRANSMISSION

(71) Applicant: Marvell International Ltd., Hamilton (BM)

(72) Inventors: Liwen Chu, San Ramon, CA (US); Hongyuan Zhang, Fremont, CA (US); Lei Wang, San Diego, CA (US); Yakun Sun, San Jose, CA (US); Jinjing Jiang, San Jose, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 52 days.

(21) Appl. No.: 15/442,398

(22) Filed: Feb. 24, 2017

Related U.S. Application Data

(63) Continuation-in-part of application No. 15/019,768, filed on Feb. 9, 2016, now Pat. No. 9,826,532.

(60) Provisional application No. 62/299,683, filed on Feb. 25, 2016, provisional application No. 62/149,383, (Continued)

(51) Int. Cl.
*H04W 28/02* (2009.01)
*H04W 72/04* (2009.01)
*H04L 12/833* (2013.01)

(52) U.S. Cl.
CPC ......... *H04W 72/0406* (2013.01); *H04L 47/31* (2013.01); *H04W 28/0278* (2013.01)

(58) Field of Classification Search
CPC .......... H04W 72/0406; H04W 28/0278; H04L 47/31
See application file for complete search history.

(56) References Cited

U.S. PATENT DOCUMENTS

| 6,862,440 B2 | 3/2005 | Sampath |
| 7,206,354 B2 | 4/2007 | Wallace et al. |
| 7,486,740 B2 | 2/2009 | Inanoglu |

(Continued)

OTHER PUBLICATIONS

IEEE P802.11ah™ /D1.3 "Draft STANDARD for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-466 (Apr. 2014).

(Continued)

*Primary Examiner* — Mohamed A Kamara
*Assistant Examiner* — Ryan C Kavleski

(57) ABSTRACT

A method for transmitting a resource request for an uplink (UL) multi-user (MU) transmission is described. A High Throughput (HT) Control field that includes buffer information corresponding to media access control (MAC) protocol data units (MPDUs) that are queued for transmission by a first communication device is generated by the first communication device. The buffer information indicates a number of bytes for the MPDUs that are queued for transmission. A resource request MPDU that includes the HT Control field is generated by the first communication device. The resource request MPDU is transmitted by the first communication device to a second communication device via a wireless communication channel to request an allocation of radio resources for the UL MU transmission by the second communication device.

30 Claims, 26 Drawing Sheets

Related U.S. Application Data filed on Apr. 17, 2015, provisional application No. 62/113,755, filed on Feb. 9, 2015.

(56) References Cited

U.S. PATENT DOCUMENTS

| | | | |
|---|---|---|---|
| 7,599,332 | B2 | 10/2009 | Zelst et al. |
| 7,729,439 | B2 | 6/2010 | Zhang et al. |
| 7,742,390 | B2 | 6/2010 | Mujtaba |
| 8,068,455 | B2 | 11/2011 | Utsunomiya et al. |
| 8,155,138 | B2 | 4/2012 | van Nee |
| 8,270,909 | B2 | 9/2012 | Zhang et al. |
| 8,339,978 | B2 | 12/2012 | Sawai et al. |
| 8,363,578 | B1 | 1/2013 | Ramamurthy et al. |
| 8,526,351 | B2 | 9/2013 | Fischer et al. |
| 8,599,804 | B2 | 12/2013 | Erceg et al. |
| 8,619,907 | B2 | 12/2013 | Mujtaba et al. |
| 8,670,399 | B2 | 3/2014 | Liu et al. |
| 8,724,720 | B2 | 5/2014 | Srinivasa et al. |
| 8,737,405 | B2 | 5/2014 | Liu et al. |
| 8,787,338 | B2 | 7/2014 | Liu et al. |
| 8,787,385 | B2 | 7/2014 | Liu et al. |
| 8,811,203 | B1 | 8/2014 | Liu et al. |
| 8,867,653 | B2 | 10/2014 | Zhang et al. |
| 8,923,118 | B1 | 12/2014 | Liu et al. |
| 8,948,283 | B2 | 2/2015 | Zhang |
| 8,971,350 | B1 | 3/2015 | Liu |
| 9,088,908 | B2 | 7/2015 | Liu |
| 9,130,727 | B2 | 9/2015 | Zhang et al. |
| 9,900,878 | B2 | 2/2018 | Seok |
| 2006/0063492 | A1 | 3/2006 | Iacono et al. |
| 2009/0196163 | A1 | 8/2009 | Du |
| 2010/0046656 | A1 | 2/2010 | van Nee et al. |
| 2010/0260159 | A1 | 10/2010 | Zhang et al. |
| 2011/0002219 | A1 | 1/2011 | Kim et al. |
| 2011/0268094 | A1 | 11/2011 | Gong et al. |
| 2012/0039196 | A1 | 2/2012 | Zhang |
| 2012/0294294 | A1 | 11/2012 | Zhang |
| 2012/0314653 | A1 | 12/2012 | Liu |
| 2013/0202001 | A1 | 8/2013 | Zhang |
| 2013/0229996 | A1 | 9/2013 | Wang et al. |
| 2014/0198692 | A1 | 7/2014 | Torab Jahromi et al. |
| 2014/0328235 | A1* | 11/2014 | Merlin ............... H04L 1/18 370/311 |
| 2015/0131517 | A1 | 5/2015 | Chu et al. |
| 2016/0014803 | A1* | 1/2016 | Merlin ............... H04H 20/55 370/236 |
| 2016/0080115 | A1 | 3/2016 | Josiam et al. |
| 2016/0100408 | A1* | 4/2016 | Hedayat ............ H04L 65/4076 370/329 |
| 2016/0227599 | A1 | 8/2016 | Lee et al. |
| 2016/0330788 | A1 | 11/2016 | Zheng et al. |
| 2016/0366254 | A1 | 12/2016 | Asterjadhi et al. |
| 2017/0170937 | A1* | 6/2017 | Chun ................ H04L 5/0048 |
| 2017/0311310 | A1* | 10/2017 | Ryu ................. H04W 84/12 |
| 2018/0020460 | A1 | 1/2018 | Hedayat |

OTHER PUBLICATIONS

IEEE Std 802.11ac/D2.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11ah™ /D1.0 "Draft STANDARD for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.16™-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).

Ansari et al., "Unified MIMO Pre-Coding Based on Givens Rotation," The Institute of Electrical and Electronics Engineers, doc. No. IEEE C802.16e-04/516r2, pp. 1-13, (Jan. 11, 2005).

Cariou et al., "Multi-channel Transmissions," Doc. No. IEEE 802.11-09/1022r0, *The Institute of Electrical and Electronics Engineers, Inc.*, pp. 1-13 (Sep. 2009).

Chun et al. "Legacy Support on HEW frame structure," doc: IEEE 11-13/1057r0, *The Institute of Electrical and Electronics Engineers, Inc.*, pp. 1-8 (Sep. 2013).

(56) References Cited

OTHER PUBLICATIONS

De Vegt, "Potential Compromise for 802.11ah Use Case Document", Institute of Electrical and Electronics Engineers, doc. No. IEEE 802.11-11/0457r0, pp. 1-27 (Mar. 2011).
Fischer et al., "Link Adaptation Subfield for VHT," doc. No. IEEE 802.11-10/1095r0, IEEE 802.11-10, 123rd IEEE 802.11 Wireless Local Area Networks session, Interim Meeting Session, Hilton Waikoloa Village, pp. 1-5 (Sep. 12, 2010).
Hiertz et al., "The IEEE 802.11 Universe," IEEE Communications Magazine, pp. 62-70, (Jan. 2010).
Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).
Liu et al., "VHT BSS Channel Selection," *Institute of Electrical and Electronics Engineers, Inc.*, doc. No. IEEE 802.11-11/1433r0, pp. 1-10 (Nov. 2011).
Love et al., "An Overview of Limited Feedback in Wireless Communication Systems," IEEE J. on Selected Areas in Communications, vo. 26, No. 8, pp. 1341-1365 (Oct. 2008).
Merlin et al., "VHT Control and Link Adaptation," doc. No. IEEE 802.11-11/0040r0, IEEE 802.22-11, 125th IEEE 802.11 Wireless Local Area Networks Session, Interim Meeting Session, Hyatt Century Plaza Hotel, Los Angeles, California, pp. 1-15 (Jan. 18, 2011).
Noh et al., "Channel Selection and Management for 11ac," Doc. No. IEEE 802.11-10/0593r1, *The Institute of Electrical and Electronics Engineers, Inc.*, pp. 1-21 (May 20, 2010).
Park et al., "Low Power Capability Support for 802.11ah," doc. No. IEEE 802.11-11/0060r1, *The Institute for Electrical and Electronics Engineers*, 7 pages (Jan. 17, 2011).
Park, "IEEE 802.11ac: Dynamic Bandwidth Channel Access," 2011 IEEE Int'l Conf. on Communications (ICC), pp. 1-5 (Jun. 2011).
Park, "Proposed Specification Framework for TGah D9.x", The Institute of Electrical and Electronics Engineers, doc. No. IEEE 802.11-yy/xxxxr0, pp. 1-30 (Jul. 2012).
Park, "Proposed Specification Framework for TGah", *The Institute of Electrical and Electronics Engineers*, doc. No. IEEE 802.11—yy/xxxxr05, pp. 1-12 (Jan. 2012).
Park, "Proposed Specification Framework for TGah", *The Institute of Electrical and Electronics Engineers*, doc. No. IEEE 802.11-11/1137r11, pp. 1-36 (Sep. 2012).
Park, "Proposed Specification Framework for TGah", *The Institute of Electrical and Electronics Engineers*, doc. No. IEEE 802.11-11/1137r6, pp. 1-13 (Mar. 2012).
Park, "Specification Framework for TGah," *The Institute of Electrical and Electronics Engineers*, doc. No. IEEE 802.11-11/1137r13, pp. 1-58 (Jan. 14, 2013).
Pedersen et al., "Carrier Aggregation for LTE-Advanced: Functionality and Performance Aspects," IEEE Communications Magazine, vol. 49, No. 6, pp. 89-95, (Jun. 1, 2011).
Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).
Redieteab et al., "Cross-Layer Multichannel Aggregation for Future WLAN Systems," 2010 IEEE Int'l Conf. on Communication Systems (ICCS), pp. 740-756 (Nov. 2010).
Shao, "Channel Selection for 802.11ah," doc.: IEEE 802.11-12/0816r0, pp. 1-11 (Jul. 2012).
Shi et al., "Phase Tracking During VHT-LTF," Doc. No. IEEE 802.11-10/0771r0, *The Institute of Electrical and Electronics Engineers, Inc.*, pp. 1-19 (Jul. 2010).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Syafei et al., "A Design of Next Generation Gigabit MIMO Wireless LAN System ," IEEE 12th Int'l Conference on Advanced Communication Technology (ICACT 2010), *The Institute of Electrical and Electronics Engineers*, pp. 941-946 (2010).
Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).
Taghavi et al., "Introductory Submission for TGah", doc. No. IEEE 802.11-11/0062r0, *Institute for Electrical and Electronics Engineers*, pp. 1-5 (Jan. 14, 2011).
Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).
Van Zelst et al., "Pilot Sequence for VHT-DATA," Doc. No. IEEE 802.11-10, 0811r1, *The Institute of Electrical and Electronics Engineers, Inc.*, pp. 1-10 (Jul. 2010).
Vermani et al. "Preamble Format for 1 MHz," *The Institute of Electrical and Electronics Engineers*, doc. No. IEEE 802.11-11/1482r2, pp. 1-30 (Nov. 2011).
Vermani et al. "Spec Framework Text for PHY Numerology," *The Institute of Electrical and Electronics Engineers*, doc. No. IEEE 802.11-11/1311r0, pp. 1-5 (Sep. 2011).
Wannstrom, "Carrier Aggregation explained," pp. 1-6 (May 2012).
Yu et al., "Coverage extension for IEEE802.11ah," *The Institute of Electrical and Electronics Engineers*, doc. No. IEEE 802.11-11/0035r1, pp. 1-10 (Jan. 2011).
Yuan et al., "Carrier Aggregation for LTE-Advanced Mobile Communication Systems," *IEEE Communications Magazine*, pp. 88-93 (Feb. 2010).
Zhang et al., "11ac Explicit Sounding and Feedback", The Institute of Electrical and Electronics Engineers, doc. No. IEEE 802.11-10/1105r0, 44 pages (Sep. 2010).
Zhang et al., "11ah Data Transmission Flow," *The Institute of Electrical and Electronics Engineers*, doc. No. IEEE 802.11-11/1484r1, pp. 1-15 (Nov. 2011).
Zhang et al., "1MHz Waveform in Wider BW", *The Institute of Electrical and Electronics Engineers*, doc. No. IEEE 802.11-12/0309r1, pp. 1-10 (Mar. 2012).
Zhang et al., "Beamforming Feedback for Single Stream," *The Institute of Electrical and Electronics Engineers*, doc. No. IEEE 802.11-12/1312r0, pp. 1-22 (Nov. 12, 2012).
Zhang et al., "VHT Link Adaptations," doc. No. IEEE802.11-11/0047r0, IEEE 802.11-11, 125th IEEE 802.11 Wireless Local Area Networks Session, Interim Meeting Session, Hyatt Century Plaza Hotel, Los Angeles, California, pp. 1-11 (Jan. 18, 2011).
U.S. Appl. No. 14/961,359, Chu et al., "Basic Service Set Color Identifier," filed Dec. 7, 2015.
U.S. Appl. No. 15/019,768, Chu et al., "Orthogonal Frequency Division Multiple Access Resource Request," filed Feb. 9, 2016.
Seok et al., "HEW PPDU Format for Supporting MIMO-OFDMA," IEEE 802.11-14/1210r0, Sep. 14, 2014 (16 pages).
IEEE Std 802.11ac™-2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-425 (Dec. 18, 2013).

\* cited by examiner

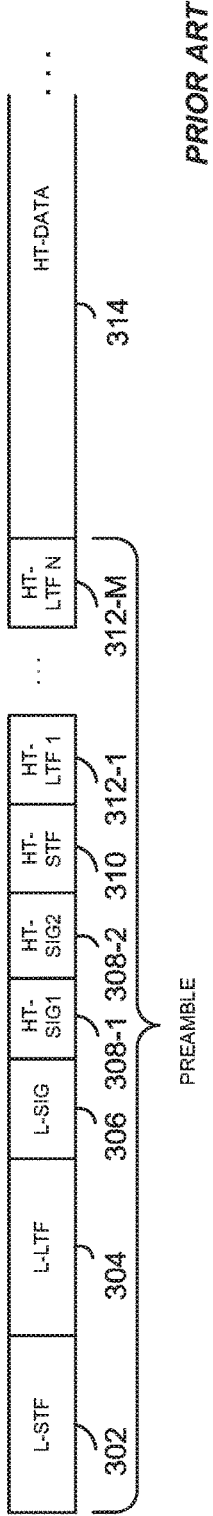
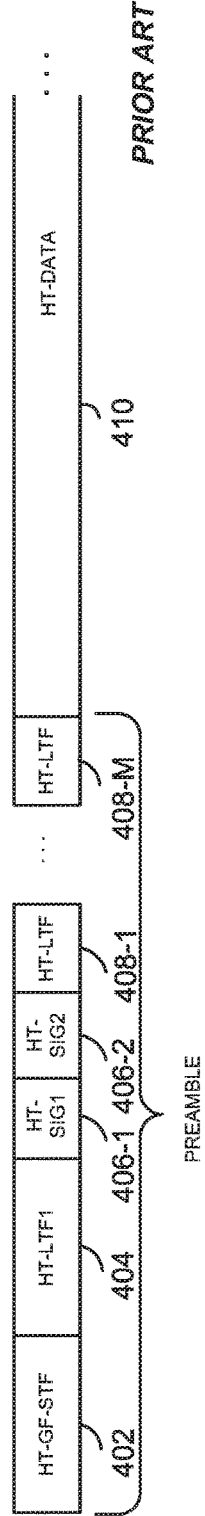
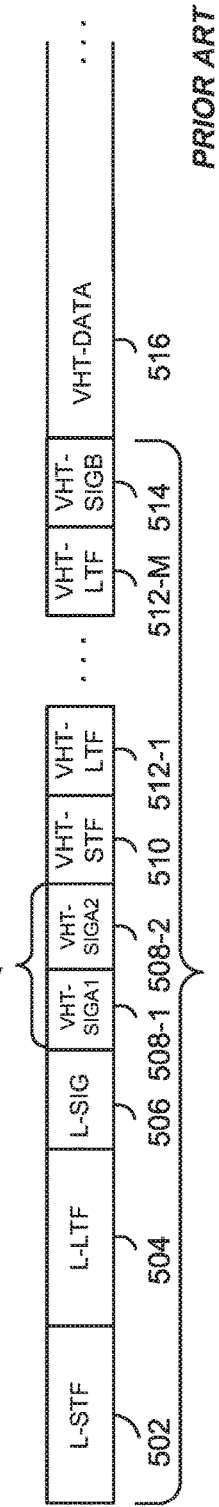

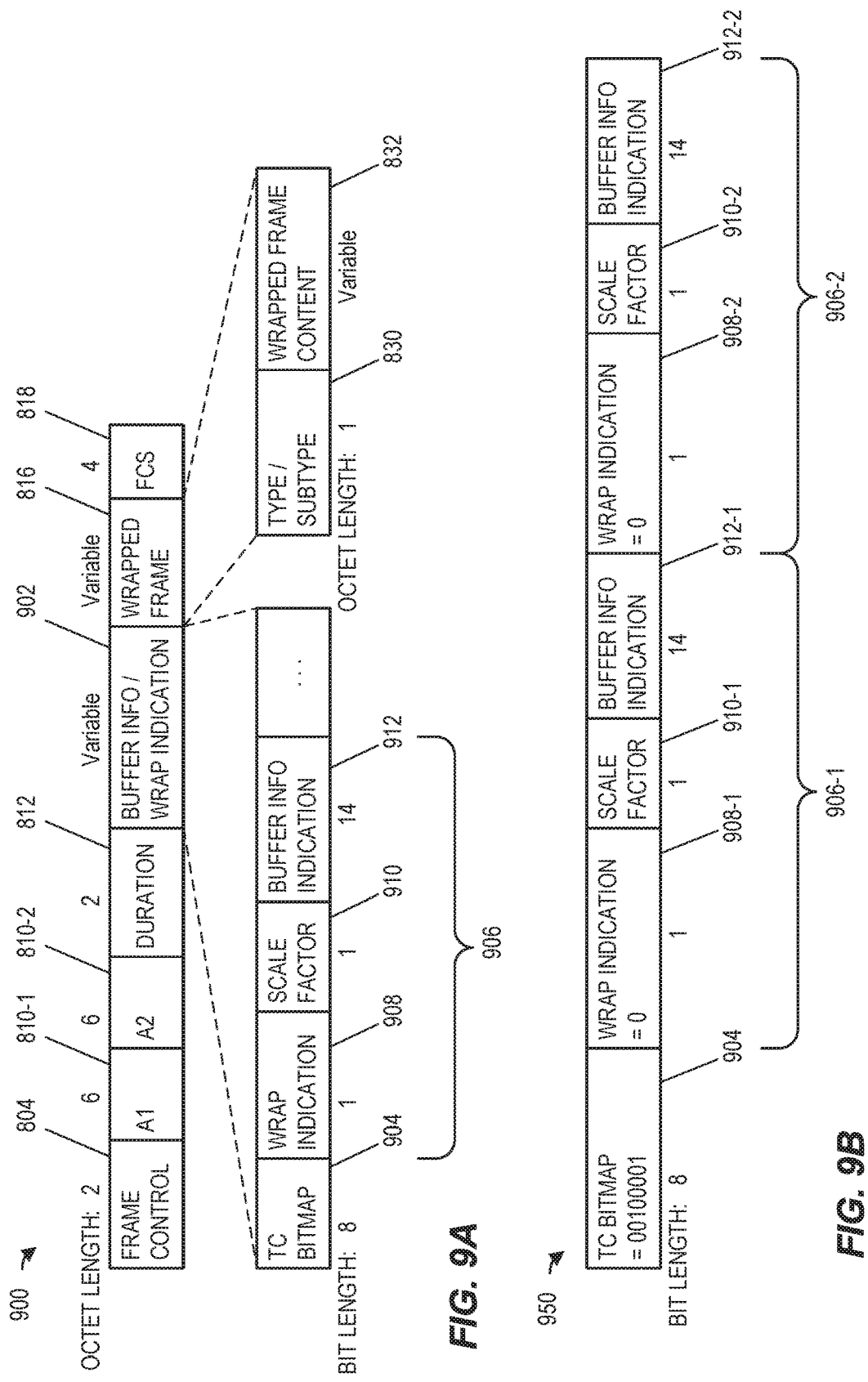

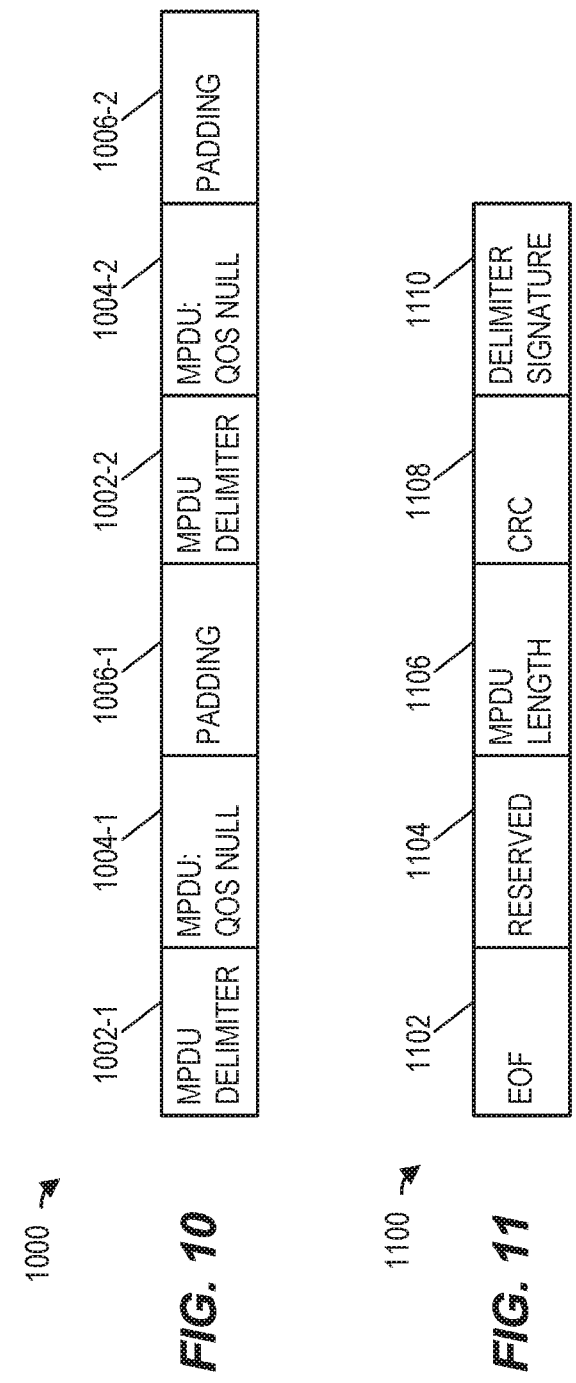

RESOURCE REQUEST FOR UPLINK MULTI-USER TRANSMISSION

CROSS-REFERENCES TO RELATED APPLICATIONS

This application claims the benefit of U.S. Provisional Patent Application No. 62/299,683, entitled "STA Resource Request," filed on Feb. 25, 2016, and is a continuation-in-part of U.S. patent application Ser. No. 15/019,768, entitled "Orthogonal Frequency Division Multiple Access Resource Request," filed on Feb. 9, 2016, which claims the benefit of U.S. Provisional Patent Application No. 62/113,755, entitled "STA Resource Request," filed on Feb. 9, 2015, and U.S. Provisional Patent Application No. 62/149,383, entitled "STA Resource Request," filed on Apr. 17, 2015, the disclosures of each of which are incorporated herein by reference in their entireties.

FIELD OF THE DISCLOSURE

The present disclosure relates generally to communication networks and, more particularly, to wireless local area networks that utilize requests for radio resources.

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for transmitting a resource request for an uplink (UL) multi-user (MU) transmission includes: generating, by a first communication device, a High Throughput (HT) Control field that includes buffer information corresponding to media access control (MAC) protocol data units (MPDUs) that are queued for transmission by the first communication device, wherein the buffer information indicates a number of bytes for the MPDUs that are queued for transmission; generating, by the first communication device, a resource request MPDU that includes the HT Control field; and transmitting, by the first communication device, the resource request MPDU to a second communication device via a wireless communication channel to request an allocation of radio resources for the UL MU transmission by the second communication device.

In another embodiment, a first communication device for transmitting a resource request for an uplink (UL) multi-user (MU) transmission includes a network interface device having one or more integrated circuits. The one or more integrated circuits are configured to: generate a High Throughput (HT) Control field that includes buffer information corresponding to media access control (MAC) protocol data units (MPDUs) that are queued for transmission by the first communication device, generate a resource request MPDU that includes the HT Control field, and transmit the resource request MPDU to a second communication device via a wireless communication channel to request an allocation of radio resources for the UL MU transmission by the second communication device. The buffer information indicates a number of bytes for the MPDUs that are queued for transmission.

In an embodiment, a method for transmitting a resource request for an uplink (UL) multi-user (MU) transmission includes: generating, by a first communication device, a resource request field that includes buffer information corresponding to media access control (MAC) protocol data units (MPDUs) that are queued for transmission by the first communication device, wherein the buffer information indicates a number of bytes for the MPDUs that are queued for transmission; generating, by the first communication device, a resource request MPDU having i) a header portion, and ii) a payload portion that includes the resource request field; and transmitting, by the first communication device, the resource request MPDU to a second communication device via a wireless communication channel to request an allocation of radio resources for the UL MU transmission by the second communication device.

In another embodiment, a method for transmitting a resource request for an uplink (UL) multi-user (MU) transmission includes: generating, by a first communication device, a QoS Control field that includes buffer information and a TID value that correspond to media access control (MAC) protocol data units (MPDUs) queued for transmission by the first communication device, wherein the buffer information indicates a number of bytes for the queued MPDUs; generating, by the first communication device, a resource request MPDU that includes the QoS Control field; and transmitting, by the first communication device, the resource request MPDU to a second communication device via a wireless communication channel to request an allocation of radio resources for the UL MU transmission by the second communication device.

BRIEF DESCRIPTION OF THE DRAWINGS

FIG. 3 is a diagram of another prior art data unit format.

FIG. 4 is a diagram of another prior art data unit format.

FIG. 5 is a diagram of another prior art data unit format.

FIG. 9A is a diagram of an example MPDU that includes buffer information for multiple resource requests, according to an embodiment.

FIG. 9B is a diagram of an example buffer information field of the MPDU of FIG. 9A, according to an embodiment.

FIG. 10 is a diagram of an example aggregate MPDU for a plurality of resource requests, according to an embodiment.

FIG. 11 is a diagram of an example MPDU delimiter for an aggregate MPDU, according to an embodiment.

DETAILED DESCRIPTION

In embodiments described below, a wireless network device such as an access point (AP) or client station (STA) of a wireless local area network (WLAN) generates an orthogonal frequency division multiplex (OFDM) data unit having a media access control (MAC) protocol data unit (MPDU) that includes resource request information. For example, the client station generates a resource request frame (e.g., resource request MPDU). In some embodiments, an AP or STA transmits or receives an MPDU of an orthogonal frequency division multiple access (OFDMA) data unit via an OFDM communication channel. In general, an AP or other network device allocates or assigns radio resources of an OFDM communication channel to specific STAs or groups of STAs for data transfers using OFDMA. For example, the AP makes an allocation of one or more tones, tone blocks, or sub-channels of the OFDM communication channel to multiple STAs. In an embodiment, the AP transmits to the STAs a resource allocation message that indicates the allocation to each of the STAs. During a subsequent OFDMA data transfer, each of the STAs simultaneously transmits an OFDM data unit using its allocated sub-channels. Although the description herein is generally based on embodiments and scenarios utilizing OFDMA, the methods and techniques described are utilized with multi-user multiple input, multiple output (MU-MIMO) configurations where different client stations use different spatial streams to transmit and/or receive frames, in various embodiments.

In some embodiments, the resource request frame indicates buffer information corresponding to frames of the STA that are queued for transmission. In other embodiments, the resource request frame indicates buffer information corresponding to a transmission opportunity (TXOP) having an indicated duration. In some embodiments, the resource request frame includes a scale factor for the buffer information to provide an increased range of available values for the buffer information and thus improved accuracy of resource requests.

Figure 1:
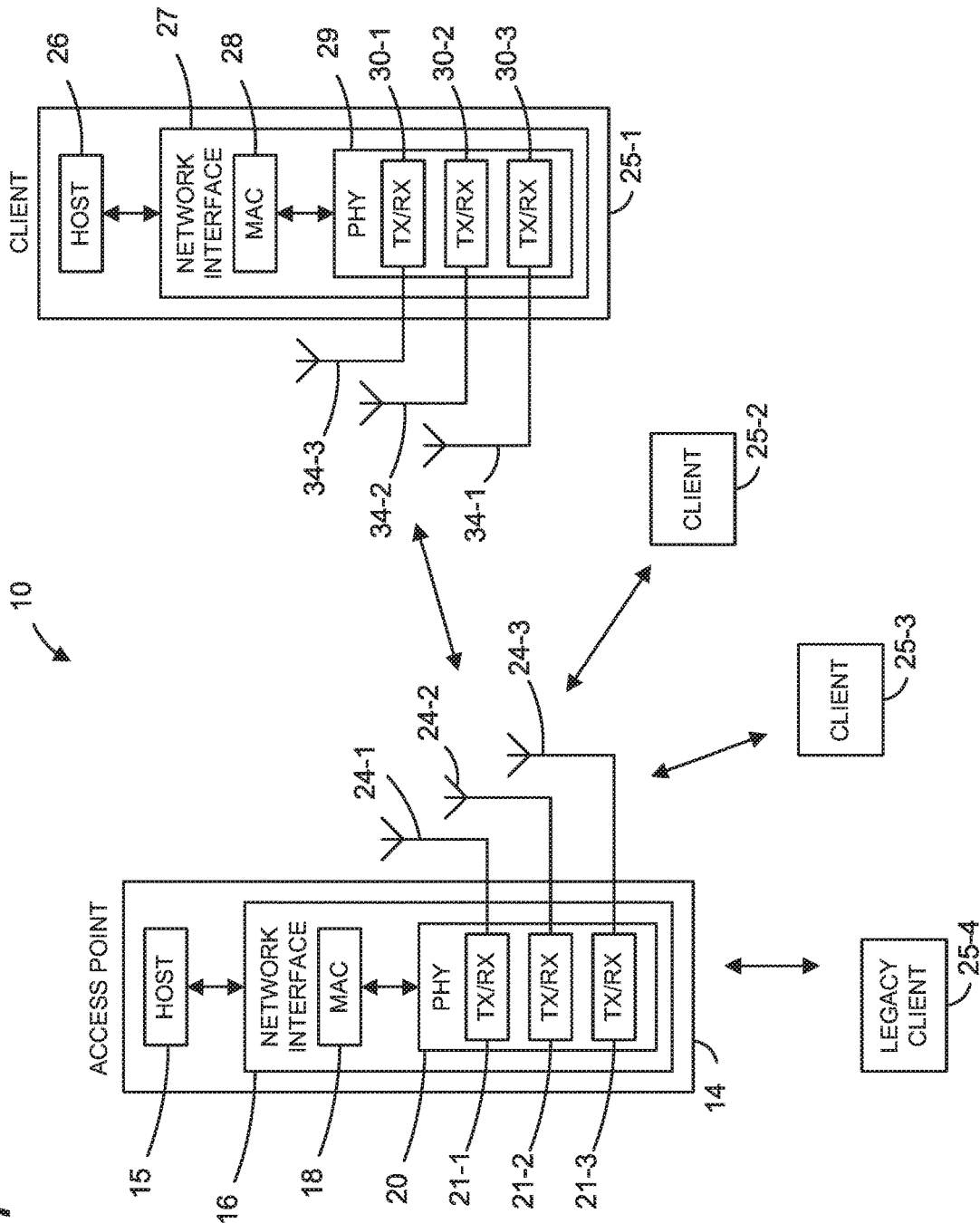
FIG. 1 is a block diagram of an example wireless local area network (WLAN), according to an embodiment.

FIG. 1 is a block diagram of a wireless local area network (WLAN) 10, according to an embodiment. An AP 14 includes a host processor 15 coupled to a network interface device 16. In an embodiment, the network interface device 16 includes one or more integrate circuits (ICs) configured to operate as discussed below. The network interface device 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In an embodiment, the PHY processor 20 scrambles an MPDU (e.g., a PHY service data unit) based on a scramble seed.

In various embodiments, the MAC processor 18 and the PHY processor 20 are configured to operate according to a first communication protocol (e.g., a High Efficiency, HE, or 802.11ax communication protocol). In some embodiments, the MAC processor 18 and the PHY processor 20 are also configured to operate according to a second communication protocol (e.g., according to the IEEE 802.11ac Standard). In yet another embodiment, the MAC processor 18 and the PHY processor 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface device 27. In an embodiment, the network interface device 27 includes one or more ICs configured to operate as discussed below. The network interface device 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown).

In various embodiments, the MAC processor 18 and the PHY processor 20 of the AP 14 are configured to generate data units conforming to the first communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, the MAC processor 18 is configured to generate MAC layer data units such as MPDUs, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units. In other embodiments, the MAC processor 18 and the PHY processor 20 of the AP 14 are configured to generate data units conforming to the second communication protocol and having formats described herein.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first and/or second communication protocols and having formats described hereinafter and to determine that such data units conform to the first and/or second communication protocols, according to various embodiments.

In various embodiments, the MAC processor 28 and the PHY processor 29 of the client device 25-1 are configured to generate data units conforming to the first and/or second communication protocols and having formats described herein. In an embodiment, the MAC processor 28 is configured to implement MAC layer functions, including MAC layer functions of the first and/or second communication protocols. In an embodiment, the PHY processor 29 is configured to implement PHY functions, including PHY functions of the first and/or second communication protocols. For example, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client device 25-1 are configured to process received data units conforming to the first and/or second communication protocols and having formats described hereinafter and to determine that such data units conform to the first and/or second communication protocols, according to various embodiments.

In various embodiments, one or both of the AP 14 and the client device 25-1 are configured to receive OFDM data units that include reduced length MPDUs. For example, the AP 14 maintains an association of a client station with an allocated sub-channel of the OFDM communication channel such that the AP 14 can generally identify which client station has transmitted an OFDM data unit based on the sub-channel on which the OFDM data unit was received. In another embodiment, the client station 25-1 maintains an association of the AP 14 with the allocated sub-channel such that the client station 25-1 can generally identify which AP has transmitted an OFDM data unit based on the sub-channel on which the OFDM data unit was received.

Figure 2A:
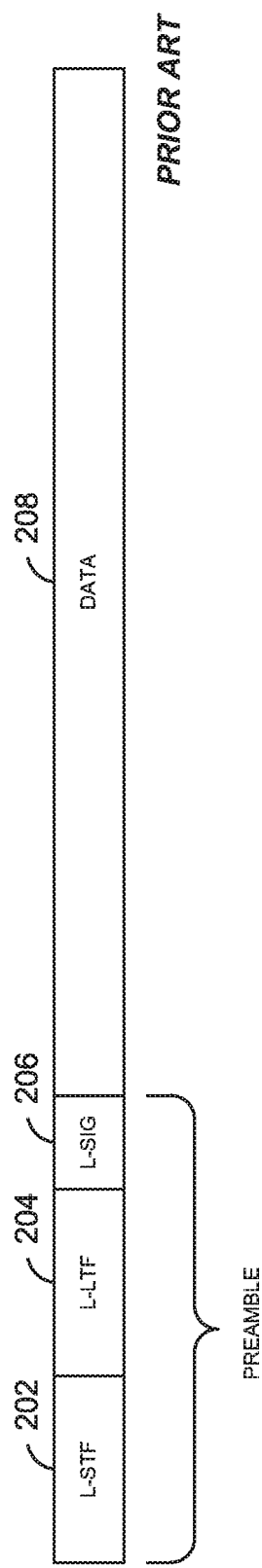
FIGS. 2A and 2B are diagrams of a prior art data unit format.
Figure 2B:
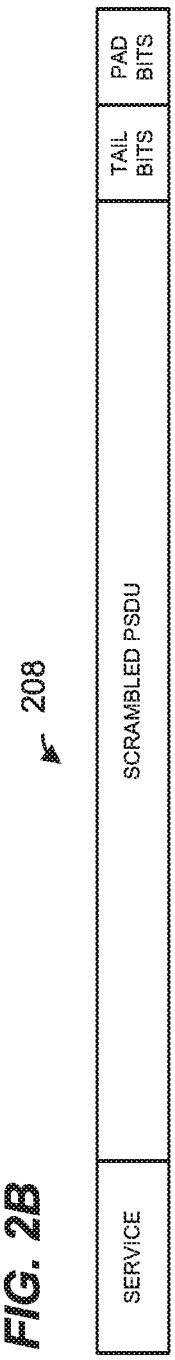

FIG. 2A is a diagram of a prior art orthogonal frequency division multiplexing (OFDM) data unit 200 that the AP 14 is configured to transmit to the legacy client station 25-4 and/or HE client station 25-1 via orthogonal frequency division multiplexing (OFDM) modulation, according to an embodiment. In an embodiment, the legacy client station 25-4 and/or HE client station 25-1 is also configured to transmit the data unit 200 to the AP 14. The data unit 200 conforms to the IEEE 802.11a Standard and occupies a 20 Megahertz (MHz) bandwidth. The data unit 200 includes a preamble having a legacy short training field (L-STF) 202, generally used for packet detection, initial synchronization, and automatic gain control, etc., and a legacy long training field (L-LTF) 204, generally used for channel estimation and fine synchronization. The data unit 200 also includes a legacy signal field (L-SIG) 206, used to carry certain physical layer (PHY) parameters with the data unit 200, such as modulation type and coding rate used to transmit the data unit, for example. The data unit 200 also includes a data portion 208. FIG. 2B is a diagram of example data portion 208 (not low density parity check encoded), which includes a service field, a scrambled physical layer service data unit (PSDU), tail bits, and padding bits, if needed. The data unit 200 is designed for transmission over one spatial or space-time stream in a single input single output (SISO) channel configuration. In various embodiments, the data portion 208 includes a MAC protocol data unit (MPDU).

FIG. 3 is a diagram of a prior art OFDM data unit 300 that the AP 14 is configured to transmit to the legacy client station 25-4 and/or HE client station 25-1 via OFDM modulation, according to an embodiment. In an embodiment, the legacy client station 25-4 and/or HE client station 25-1 is also configured to transmit the data unit 300 to the AP 14. The data unit 300 conforms to the IEEE 802.11n Standard, occupies a 20 MHz or 40 MHz bandwidth, and is designed for mixed mode situations, i.e., when the WLAN includes one or more client stations that conform to the IEEE 802.11a Standard but not the IEEE 802.11n Standard. The data unit 300 includes a preamble having an L-STF 302, an L-LTF 304, an L-SIG 306, a high throughput signal field (HT-SIG) 308, a high throughput short training field (HT-STF) 310, and M data high throughput long training fields (HT-LTFs) 312, where M is an integer generally based on the number of spatial streams used to transmit the data unit 300 in a multiple input multiple output (MIMO) channel configuration. In particular, according to the IEEE 802.11n Standard, the data unit 300 includes two HT-LTFs 312 if the data unit 300 is transmitted using two spatial streams, and four HT-LTFs 312 is the data unit 300 is transmitted using three or four spatial streams. An indication of the particular number of spatial streams being utilized is included in the HT-SIG field 308. The data unit 300 also includes a data portion 314. In various embodiments, the data portion 314 includes an MPDU.

FIG. 4 is a diagram of a prior art OFDM data unit 400 that the AP 14 is configured to transmit to the legacy client station 25-4 and/or HE client station 25-1 via OFDM modulation, according to an embodiment. In an embodiment, the legacy client station 25-4 and/or HE client station 25-1 is also configured to transmit the data unit 400 to the AP 14. The data unit 400 conforms to the IEEE 802.11n Standard, occupies a 20 MHz or 40 MHz bandwidth, and is designed for "Greenfield" situations, i.e., when the WLAN does not include any client stations that conform to the IEEE 802.11a Standard, and only includes client stations that conform to the IEEE 802.11n Standard or newer standard than 802.11n (e.g., IEEE 802.11ac). The data unit 400 includes a preamble having a high throughput Greenfield short training field (HT-GF-STF) 402, a first high throughput long training field (HT-LTF1) 404, a HT-SIG 406, and M data HT-LTFs 408. The data unit 400 also includes a data portion 410. In various embodiments, the data portion 410 includes an MPDU.

FIG. 5 is a diagram of a prior art OFDM data unit 500 that the AP 14 is configured to transmit to the legacy client station 25-4 and/or HE client station 25-1 via OFDM modulation, according to an embodiment. In an embodiment, the legacy client station 25-4 and/or HE client station 25-1 is also configured to transmit the data unit 500 to the AP 14. The data unit 500 is designed for "Mixed field" situations and conforms to the IEEE Standard for Information Technology, Part 11: Wireless LAN Medium Access Control (MAC) and Physical Layer (PHY) Specifications, Amendment 4: Enhancements for Very High Throughput for Operations in Bands below 6 GHz, 2013 ("the IEEE 802.11ac standard"), the disclosure of which is incorporated herein by reference in its entirety. The data unit 500 occupies a 20 MHz bandwidth. In other embodiments or scenarios, a data unit similar to the data unit 500 occupies a different suitable bandwidth, such as a 40 MHz, an 80 MHz, or a 160/80+80 MHz bandwidth. The data unit 500 includes a preamble having an L-STF 502, an L-LTF 504, an L-SIG 506, two first very high throughput signal fields (VHT-SIGAs) 508 including a first very high throughput signal field (VHT-SIGA1) 508-1 and a second very high throughput signal field (VHT-SIGA2) 508-2, a very high throughput short training field (VHT-STF) 510, M very high throughput long training fields (VHT-LTFs) 512, and a second very high throughput signal field (VHT-SIG-B) 514. The data unit 500 also includes a data portion 516. In various embodiments, the data portion 516 includes an MPDU.

In an embodiment, the data unit 500 occupies a bandwidth that is an integer multiple of 20 MHz and the L-STF 502 is duplicated within each 20 MHz sub-band. In an embodiment, the VHT-STF 510 has a duration of 4.0 microseconds and uses a same frequency sequence as the L-STF 502. For example, the VHT-STF 510 uses the frequency sequence defined in equation 22-29 of the IEEE 802.11ac standard. In at least some embodiments, the VHT-STF 510 occupies a whole bandwidth for the data unit 500 (e.g., 20 MHz, 40 MHz, 80 MHz, etc.) and is mapped to multiple antennas for MIMO or beamforming in a manner similar to the data portion 516.

Figure 6:
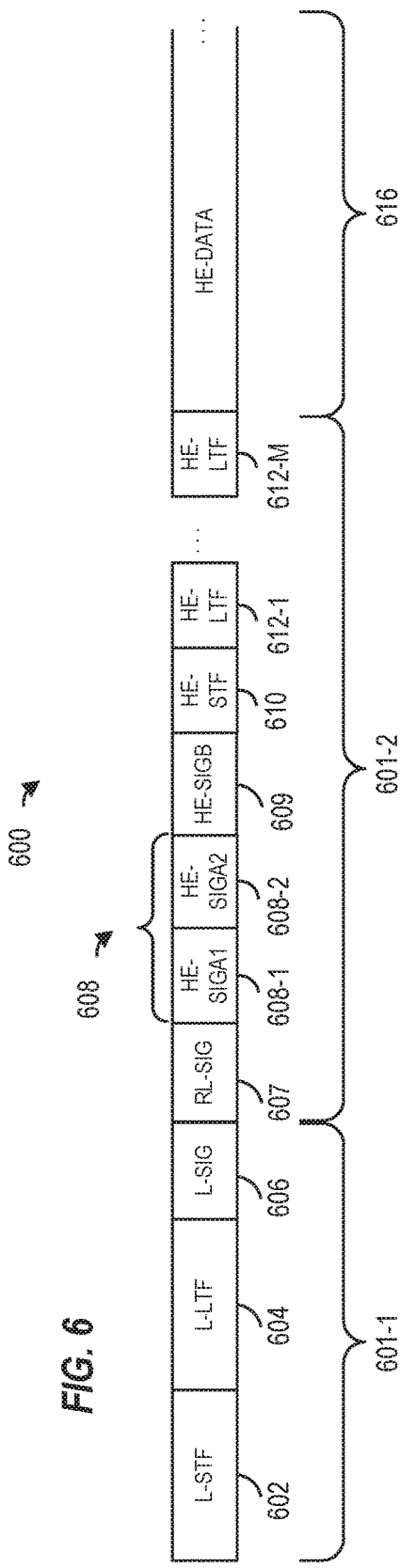
FIG. 6 is a diagram of an example orthogonal frequency division multiplexing (OFDM) data unit, according to an embodiment.

FIG. 6 is a diagram of an OFDM data unit 600 that the AP 14 is configured to transmit to the client station 25-1 via orthogonal frequency domain multiplexing (OFDM) modulation, according to an embodiment. In an embodiment, the client station 25-1 is also configured to transmit the data unit 600 to the AP 14. The data unit 600 conforms to the first communication protocol and occupies a 20 MHz bandwidth. Data units that conform to the first communication protocol similar to the data unit 600 may occupy other suitable bandwidths such as 40 MHz, 80 MHz, 160 MHz, 320 MHz, 640 MHz, etc., for example, or other suitable bandwidths, in other embodiments. The data unit 600 is suitable for "mixed mode" situations, i.e., when the WLAN 10 includes a client station (e.g., the legacy client station 25-4) that conforms to a legacy communication protocol, but not the first communication protocol. The data unit 600 is utilized in other situations as well, in some embodiments.

In an embodiment, the data unit 600 includes a preamble 601 having an L-STF 602, an L-LTF 604, an L-SIG 606, a repeated legacy signal (RL-SIG) field 607 that follows the L-SIG 606, two first HE signal fields (HE-SIGAs) 608 including a first HE signal field (HE-SIGA1) 608-1 and a second HE signal field (HE-SIGA2) 608-2, a third HE signal field (HE-SIGB) 609, a HE short training field (HE-STF) 610, and an integer number M HE long training fields (HE-LTFs) 612. In an embodiment, the preamble 601 includes a legacy portion 601-1, including the L-STF 602, the L-LTF 604, and the L-SIG 606, and a non-legacy portion 601-2, including the RL-SIG 607, HE-SIGAs 608, HE-SIGB 609, HE-STF 610, and M HE-LTFs 612.

Each of the L-STF 602, the L-LTF 604, the L-SIG 606, the RL-SIG 607, the HE-SIGAs 608, the HE-STF 610, the M HE-LTFs 612, and the HE-SIGB 609 are included in an integer number of one or more OFDM symbols. For example, the HE-SIGAs 608 correspond to two OFDM symbols, where the HE-SIGA1 608-1 field is included in the first OFDM symbol and the HE-SIGA2 is included in the second OFDM symbol. In another embodiment, for example, the preamble 601 includes a third HE signal field (HE-SIGA3, not shown) and the HE-SIGAs 608 correspond to three OFDM symbols, where the HE-SIGA1 608-1 field is included in the first OFDM symbol, the HE-SIGA2 is included in the second OFDM symbol, and the HE-SIGA3 is included in the third OFDM symbol. In at least some examples, the HE-SIGAs 608 are collectively referred to as a single HE signal field (HE-SIGA) 608. In some embodiments, the data unit 600 also includes a data portion 616. In other embodiments, the data unit 600 omits the data portion 616 (e.g., the data unit 600 is a null-data frame).

In the embodiment of FIG. 6, the data unit 600 includes one of each of the L-STF 602, the L-LTF 604, the L-SIG 606, and the HE-SIGA1s 608. In other embodiments in which an OFDM data unit similar to the data unit 600 occupies a cumulative bandwidth other than 20 MHz, each of the L-STF 602, the L-LTF 604, the L-SIG 606, the HE-SIGA1s 608 is repeated over a corresponding number of 20 MHz-wide sub-bands of the whole bandwidth of the data unit, in an embodiment. For example, the OFDM data unit occupies an 80 MHz bandwidth and, accordingly, includes four of each of the L-STF 602, the L-LTF 604, the L-SIG 606, and the HE-SIGA1s 608 in four 20 MHz-wide sub-bands that cumulatively span the 80 MHz bandwidth, in an embodiment. In some embodiments, the modulation of different 20 MHz-wide sub-bands signals is rotated by different angles. For example, in one embodiment, a first sub-band is rotated 0-degrees, a second sub-band is rotated 90-degrees, a third sub-band is rotated 180-degrees, and a fourth sub-band is rotated 270-degrees. In other embodiments, different suitable rotations are utilized. The different phases of the 20 MHz-wide sub-band signals result in reduced peak to average power ratio (PAPR) of OFDM symbols in the data unit 600, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIGB and the HE data portion occupy the corresponding whole bandwidth of the data unit.

Figure 7:
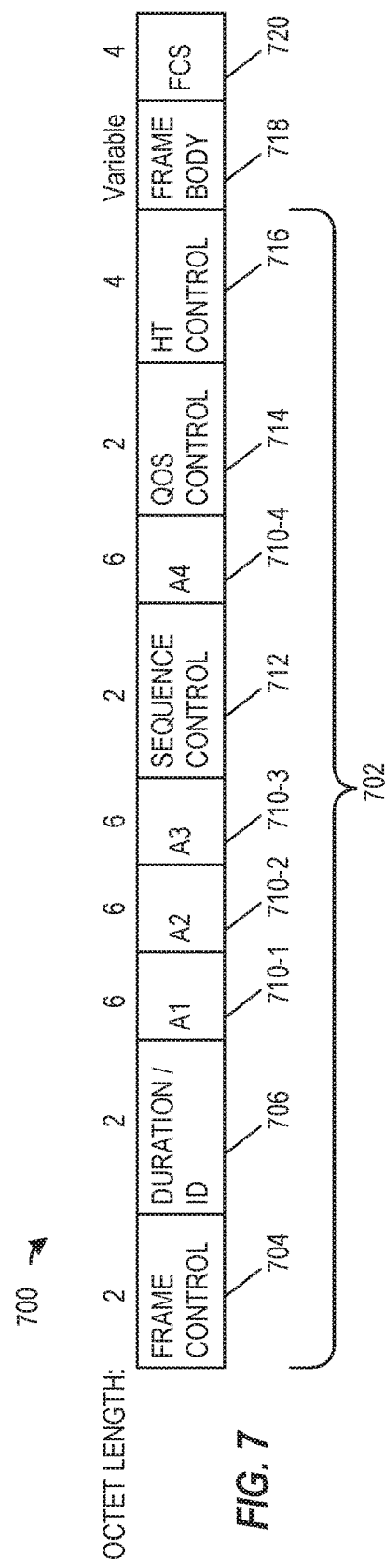
FIG. 7 is a diagram of an example medium access control (MAC) protocol data unit (MPDU), according to an embodiment.

FIG. 7 is a diagram of an MPDU 700, according to an embodiment. The MPDU 700 includes a MAC header 702, a frame body 718, and a frame check sequence field 720. The MPDU 700 generally conforms to the IEEE Standard for Information Technology, Part 11: Wireless LAN Medium Access Control (MAC) and Physical Layer (PHY) Specifications, 2012 ("the IEEE 802.11-2012 standard"), the disclosure of which is incorporated herein by reference in its entirety. The number above each field in FIG. 7 indicates the number of octets occupied by the corresponding field. Accordingly, the MAC header 702 includes a frame control field 704 (2 octets), a duration/ID field 706 (2 octets), a first address (A1) field 710-1 (6 octets), a second address (A2) field 710-2 (6 octets), a third address (A3) field (6 octets) 710-3, a sequence control field 712 (2 octets), a fourth address (A4) field 710-4 (6 octets), a QoS control field 714 (2 octets), and an HT control field 716 (4 octets). The MPDU 700 also includes the frame body 718 and the four-octet frame check sequence (FCS) field 720. In some embodiments, the frame body 718 is omitted (e.g., a null data frame). Each of the address fields 710 is a 48 bit (6 octet) field that includes a globally unique MAC address of a device associated with the data unit 700, such as a transmitting device of the data unit 700, a receiving device of the data unit 700, etc. In general, the MAC header 702 occupies 36 octets of the MPDU 700.

Figure 8:
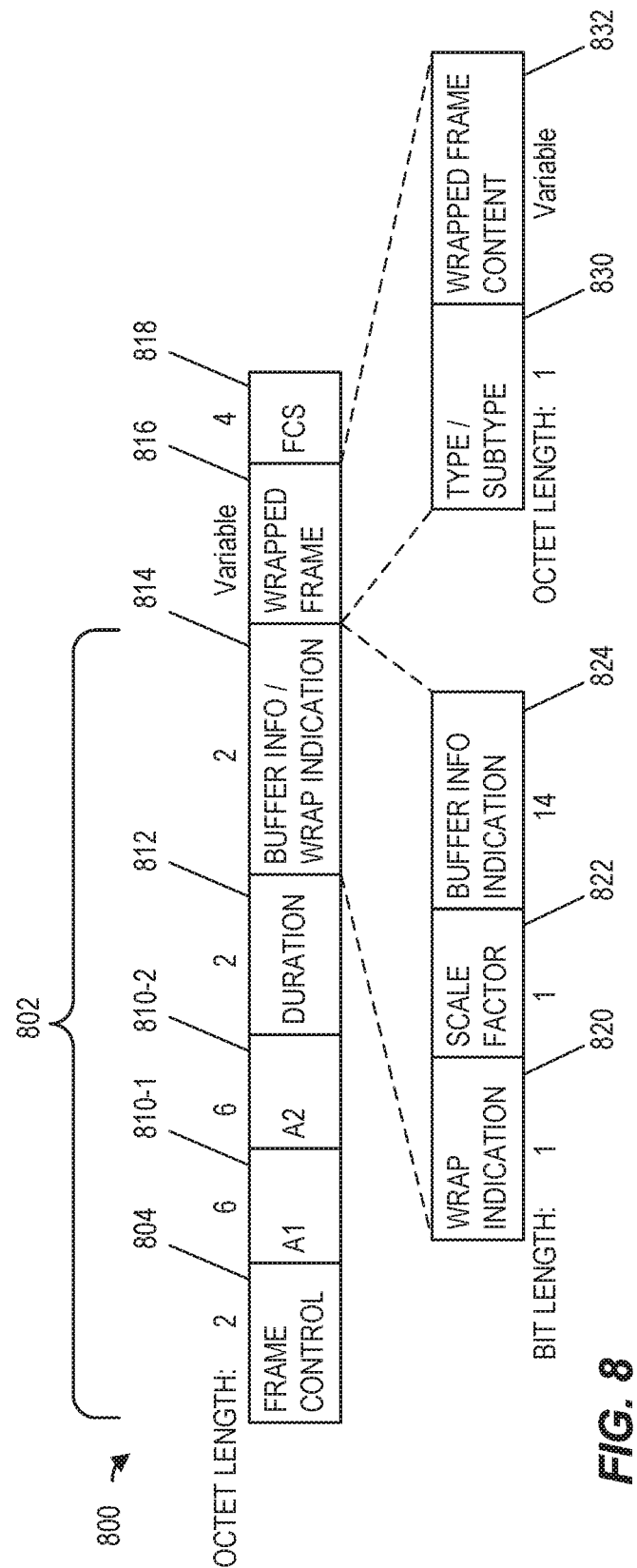
FIG. 8 is a diagram of an example MPDU that includes buffer information for a resource request, according to an embodiment.

FIG. 8 is a diagram of an MPDU 800 that includes buffer information for a resource request, according to another embodiment. The MPDU 800 includes a MAC header 802, a frame body 816, and a frame check sequence (FCS) field 818. The number above each field of the MPDU 800 in FIG. 8 indicates the number of octets occupied by the corresponding field. Accordingly, the MAC header 802 includes a frame control field 804 (2 octets), a first address (A1) field 810-1 (6 octets), a second address (A2) field 810-2 (6 octets), a duration field (2 octets) 812, and a resource request field 814 (2 octets), in an embodiment. In some embodiments, the frame body 816 is omitted (e.g., a null data frame).

In some embodiments (not shown), the MAC header 802 has a "short frame format" having a reduced length of the MAC header 802. In an embodiment, the MPDU 800 is similar to "short frames" as described in the IEEE 802.11ah protocol. In some embodiments, one or more of the address fields 810-1 or 810-2 is a 48 bit (6 octet) field that includes a globally unique MAC address of a device associated with the data unit 800, such as a transmitting device of the data unit 800, a receiving device of the data unit 800, etc. In other embodiments, one or more of the address fields 810-1 or

810-2 is a 16 bit (2 octet) field that includes a BSS color identifier, partial association identification (PAID or partial AID), or other suitable address having a reduced length as compared to a MAC address (i.e., less than 6 octets). In various embodiments, the BSS color identifier occupies 6 bits, 7 bits, 10 bits, or another suitable number of bits.

In various embodiments, the resource request field 814 indicates buffer information corresponding to queued MPDUs that are queued for transmission, in an embodiment. For example, the buffer information indicates a TXOP duration that the client station 25 estimates is needed for transmission of the queued MPDUs or a number of bytes for the queued MPDUs. The buffer information from the client station 25 allows the AP to determine one or more parameters for uplink OFDMA resource allocation, for example, OFDMA physical layer convergence protocol (PLCP) protocol data unit (PPDU) length, channel position, channel bandwidth, modulation and control scheme, transmission power, or other suitable parameters. In some scenarios, the client station 25 utilizes the QoS control field 714 to provide buffer information; however, the QoS control field as described in the IEEE 802.11-2012 standard cannot readily describe a number of bytes less than 256 bytes or higher than 64,768 bytes in increments of 256 octets and cannot describe a TXOP duration less than 32 microseconds or higher than 8,160 microseconds in increments of 32 microseconds.

In the embodiment shown in FIG. 8, the resource request field 814 includes i) a scale factor subfield 822 that indicates a scale value, and ii) a resource subfield 824 (or buffer information indication) that indicates a base resource value. The scale value multiplied by the base resource value indicates buffer information with improved accuracy as compared to the QoS control field of the IEEE 802.11-2012 standard. In some scenarios, the buffer information indicated by the resource request field 814 is a number of bytes equal to the scale value of the scale factor subfield 822 multiplied by the base resource value of the resource subfield 824. In other scenarios, the buffer information indicated by the resource request subfield 814 is a transmission opportunity (TXOP) duration indicated by the scale value multiplied by the base resource value. In some embodiments, the resource request field 814 includes a request type subfield (not shown) that indicates whether the buffer information indicates the number of bytes or the TXOP duration. For example, a reserved bit of the frame control field 804 indicates whether the buffer information indicates the number of bytes or the TXOP duration.

The number below the fields 820, 822, and 824 of the MPDU 800 in FIG. 8 indicates the number of bits occupied by the corresponding field. The scale factor field 822 has one bit that indicates a scale value or increment value. In an embodiment, a value of "0" for the scale factor field 822 corresponds to a scale value of one byte while a value of "1" corresponds to a scale value of 256 bytes. In other embodiments, the value of "0" for the scale factor field 822 corresponds to a scale value of two bytes, three bytes, eight bytes, or another suitable value while the value of "1" corresponds to a scale value of 16 bytes, 32 bytes, 512 bytes, or another suitable value. Accordingly, the 14 bits of the resource subfield 824 provide a base resource value that, when multiplied with the scale value, provide buffer information with improved accuracy. In another embodiment, a value of "0" for the scale factor field 822 corresponds to a scale value of one microsecond while a value of "1" corresponds to a scale value of 16 microseconds. In other embodiments, the value of "0" for the scale factor field 822 corresponds to a scale value of two microseconds, four microseconds, 16 microseconds, or another suitable value while the value of "1" corresponds to a scale value of 32 microseconds, 64 microseconds, or another suitable value.

The MPDU 800 is a resource request MPDU in that the resource request field 814 provides buffer information to a receiving device (e.g., an access point). In some embodiments, the client station 25 omits the frame body 816 from the resource request MPDU, in a manner similar to a QoS null frame. In other scenarios, the resource request MPDU wraps another MPDU or a portion of another MPDU (e.g., a wrapped frame) within the frame body 816. In the embodiment shown in FIG. 8, the resource request field 814 also includes a wrapper subfield 820. The wrapper subfield 820 indicates whether a wrapped MPDU is included in the resource request MPDU. In an embodiment, a value of "1" within the wrapper subfield 820 indicates that a wrapped frame is present, while a value of "0" within the wrapper subfield 820 indicates that a wrapped frame is not present (i.e., the frame body 816 is omitted). In an embodiment, the client station 25 generates the frame check sequence field 818 based on the wrapped frame when present within the frame body 816. In some embodiments, the AP or client station 25 omits an A-MPDU delimiter between the frames, a frame check sequence field for the second frame, or both the A-MPDU and frame check sequence field since a second frame is wrapped with the first frame.

In an embodiment, the wrapped frame shares at least some of the parameters provided within the MAC header 802, for example, the first address field 810-1, the second address field 810-2, and the duration field 812. In some embodiments, one or more parameters that are different from the resource request MPDU are included within the frame body 816. In the embodiment shown in FIG. 8, the frame body 816 includes i) a wrapped type subfield 830 that indicates a frame type of the wrapped MPDU, and ii) a wrapped payload subfield 832 that includes a payload for the wrapped MPDU (e.g., frame content for the wrapped MPDU). In some embodiments, wrapped type subfield 830 indicates a type and sub-type of the wrapped MPDU. In an embodiment, the type and sub-type of the wrapped MPDU may be different from that of the resource request MPDU. For example, the resource request MPDU may have a type and sub-type corresponding to a QoS Null data frame, while the wrapped MPDU may have a type and sub-type corresponding to a clear to send control frame, a Data+CF-Ack data frame, or other suitable control frames, management frames, or data frames.

In the embodiment shown in FIG. 8, the first address field 810-1 and the second address field 810-2 are the receiver address and transmitter address for the MPDU 800. In some embodiments, the client station 25 generates and transmits the MPDU 800 in response to a polling frame from the access point. In an embodiment, the client station 25 omits the second address field 810-2 (transmitter address) when transmitting in response to the polling frame. In one such embodiment, the access point determines which client station 25 transmitted the MPDU 800 based on an OFDM sub-channel on which the MPDU 800 was received.

FIG. 9A is a diagram of an MPDU 900 that includes buffer information for multiple resource requests, according to an embodiment. The MPDU 900 is generally similar to the MPDU 800, but a resource request field 902 replaces the resource request field 814. The resource request field 902 provides buffer information for multiple data groups by utilizing a bitmap subfield 904 and one or more resource subfields, such as the resource subfield 906. In an embodiment, the bitmap subfield 904 indicates which data groups of a plurality of data groups correspond to a resource subfield included in the resource request field 902. For example, the bitmap subfield 904 includes a bit for each of the plurality of data groups.

In an embodiment, each of the one or more resource subfields includes instances of a wrapper subfield 908, a scale factor 910, and a base resource value field 912 for the corresponding data group. In an embodiment, each of the one or more resource subfields also includes a request type subfield (not shown) that indicates whether the buffer information for the corresponding data group indicates the number of bytes or the TXOP duration. In some embodiments, the wrapper indication 908 and the frame body 816 are omitted. In other embodiments, the wrapper indication 908 indicates whether a portion of the frame body 816 (i.e., an instance of the wrapped type subfield 830 and wrapped payload 832) are included within the frame body 816 for the corresponding data group.

In the embodiment shown in FIG. 9A, the bitmap subfield 904 has eight bits corresponding to eight data groups where the data groups are traffic classes. Accordingly, the MPDU 900 includes up to eight instances of the resource subfield 906. In other embodiments, the bitmap subfield 904 has six bits, seven bits, nine bits, ten bits, or another suitable number of bits. In an embodiment, the bitmap subfield 904 has eight bits, at least a portion of which are reserved or unused bits. For example, the bitmap subfield 904 includes four reserved bits and four bits corresponding to four data groups where the data groups are access categories. In an embodiment, a reserved bit of the frame control field 804 indicates whether the buffer information corresponds to traffic classes or access categories. In some embodiments, the buffer information corresponds to a total number of queued MPDUs for a plurality of data groups. In an embodiment, the client station 25 has 512 bytes, 384 bytes, and 128 bytes of queued MPDUs for traffic classes having a traffic identifier (TID) of 0, 3, and 5, respectively, and the buffer information indicates 1024 bytes (a sum total of 512, 384, and 128 bytes). In an embodiment, a reserved bit of the frame control field 804 indicates whether the buffer information corresponds to traffic classes, access categories, or a total number of queued MPDUs.

FIG. 9B is a diagram of a buffer information field 950, for example, an instance of the buffer information field 902 of FIG. 9A, according to an embodiment. In the illustrated embodiment, the buffer information field 950 includes the bitmap subfield 904 having a value of "00100001," which indicates that buffer information for traffic classes corresponding to TID 0 and TID 5 are included within the buffer information field 950. Accordingly, the buffer information field 950 includes a resource subfield 906-1 (e.g., for TID 0) and a resource subfield 906-2 (e.g., for TID 5).

FIG. 10 is a diagram of an aggregate MPDU (A-MPDU) 1000 for a plurality of resource requests, according to an embodiment. The client station 25 generates the A-MPDU 1000 that includes an MPDU for each of the plurality of resource requests, for example, a plurality of the MPDUs 800. The A-MPDU 1000 includes an MPDU delimiter 1002, an MPDU 1004, and padding 1006 for each included MPDU. In an embodiment, each MPDU of the A-MPDU 1000 is a QoS null MPDU. In the embodiment shown in FIG. 10, the A-MPDU 1000 includes the MPDU 1004-1 and MPDU 1004-2, each of which is a QoS null MPDU. The QoS null MPDU 1004-1 corresponds to a first data group and the QoS null MPDU 1004-2 corresponds to a second data group that is different from the first data group, in an embodiment. In an embodiment, the access point generates and transmits a single acknowledgment frame to acknowledge a received A-MPDU 1000 if at least one of the MPDUs 1004 is correctly received. In some embodiments, the A-MPDU 1000 includes one or more other MPDUs, for example, data MPDUs, control MPDUs, or other suitable MPDUs. FIG. 11 is a diagram of an MPDU delimiter 1100 for an aggregate MPDU, such as the A-MPDU 1000, according to an embodiment. The MPDU delimiter 1100 includes an end of frame subfield 1102, a reserved subfield 1104, an MPDU length subfield 1106, a cyclic redundancy check (CRC) field 1108, and a delimiter signature 1110. In the embodiment of FIG. 10, each MPDU delimiter 1002 indicates an end of frame value of zero and an MPDU length that is not equal to zero.

Figures 12, 13:
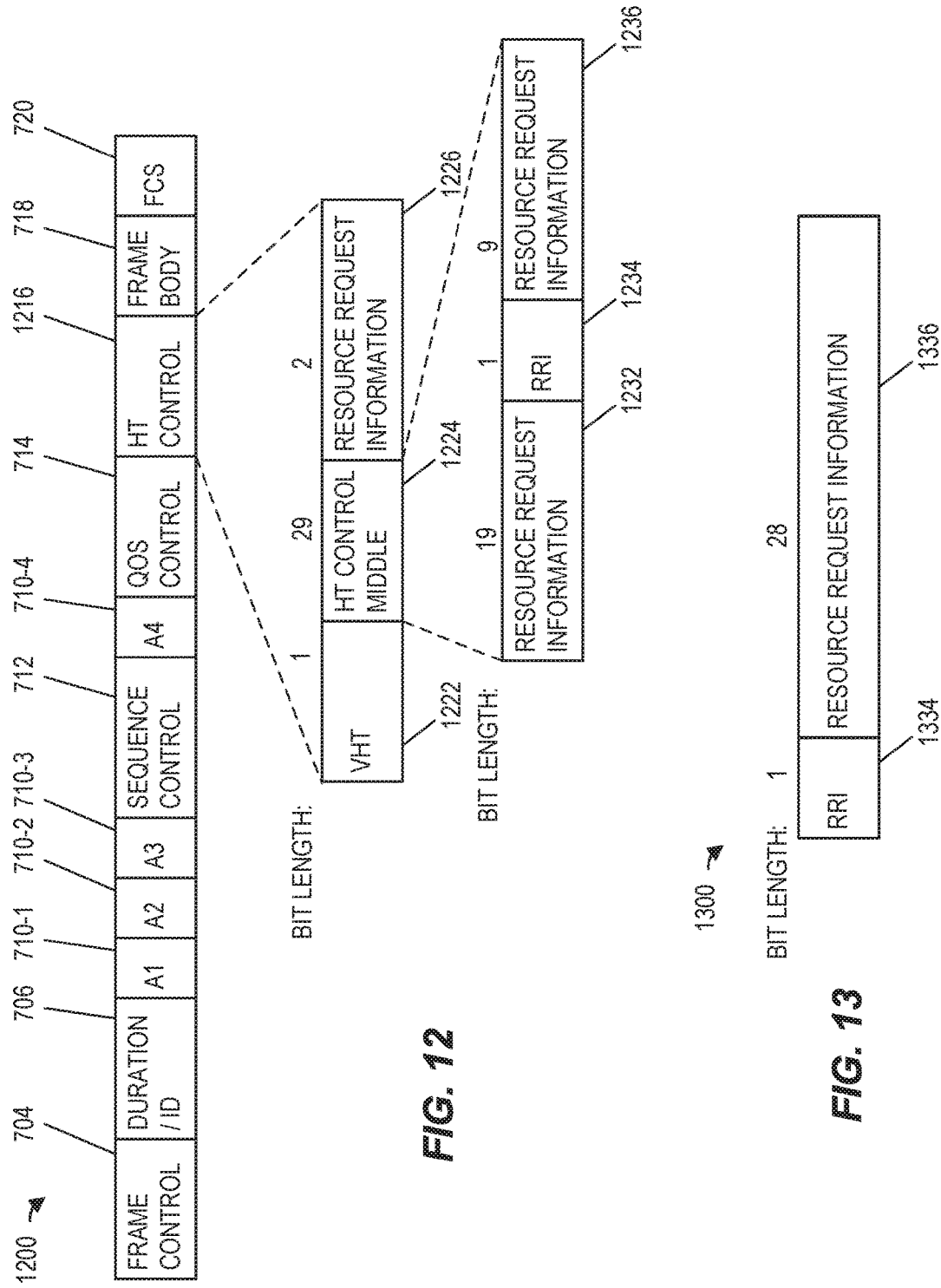
FIG. 12 is a diagram of an example MPDU that includes buffer information in a high throughput (HT) control field, according to an embodiment.
FIG. 13 is a diagram of an example HT control middle subfield that includes buffer information, according to another embodiment.

FIG. 12 is a diagram of an MPDU 1200 that includes buffer information in a high throughput (HT) control field, according to an embodiment. The MPDU 1200 is generally similar to the MPDU 700 and includes similar fields as shown, but an HT control field 1216 replaces the HT control field 716. In various embodiments, the MPDU 1200 is a data frame, control frame, management frame, or other suitable frame that repurposes the HT control field 1216 to include buffer information for a resource request. In various embodiments, the HT Control field is an HT variant HT Control field or a VHT variant HT Control field. In an embodiment, a reserved bit in the VHT variant HT Control field is set to a value of 1 (or other suitable value) to indicate that the HT Control field indicates buffer information. Similarly, in another embodiment, a reserved bit in the HT variant HT Control field is set to a value of 1 (or other suitable value) to indicate that the HT Control field indicates buffer information. In one embodiment, the HT control field 1216 includes a very high throughput (VHT) indicator subfield 1222 (1 bit), an HT control middle subfield 1224 (29 bits), and a resource request subfield 1226 (2 bits).

The VHT indicator subfield 1222 indicates whether the format of the HT control field 1216 is based on an HT format or on an VHT format, as described in IEEE 802.11ac, Section 8.2.4.6 HT Control field. In the embodiment shown in FIG. 12, the VHT indicator subfield 1222 has a value of zero, which indicates that the format of the HT control field 1216 is based on the HT format, i.e. HT variant HT Control field (IEEE 802.11ac, Section 8.2.4.6.2 HT variant). Accordingly, the HT control middle subfield 1224 includes a resource request subfield 1232 (19 bits), a resource request indicator 1234 (1 bit), and a resource request subfield 1236 (9 bits). The resource request indicator 1234, located at bit 20 of the HT control field 1216, corresponds to a reserved subfield of the HT control middle subfield of the HT format and indicates whether the HT control field 1216 indicates resource request information or HT variant Control information. For example, a value of "1" in the resource request indicator 1234 indicates that the HT Control field includes the resource request subfields 1226, 1232, and 1236 for a resource request, while a value of "0" indicates that the HT Control field includes HT variant HT Control information.

FIG. 13 is a diagram of an HT control middle subfield 1300 that includes buffer information for the HT control field 1216, according to another embodiment. In the embodiment shown in FIG. 13, the VHT indicator subfield 1222 has a value of one, which indicates that the format of the HT control field 1216 is based on the VHT format, i.e. VHT variant HT Control (IEEE 802.11ac, Section 8.2.4.6.3 VHT variant). Accordingly, the HT control middle subfield 1224 includes a resource request indicator 1334 (1 bit) and resource request subfield 1336 (28 bits). The resource request indicator 1334, located at bit 1 of the HT control field 1216, corresponds to a reserved subfield of the HT control middle subfield of the VHT format and indicates whether the HT control field 1216 indicates resource request information or VHT variant HT Control information.

Figure 14:
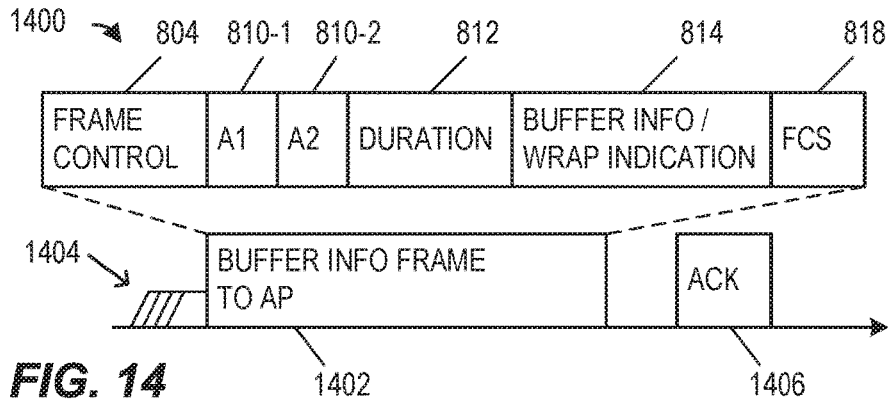
FIG. 14 is a diagram of an example sequence of OFDM data units for providing buffer information to an access point, according to an embodiment.

FIG. 14 is a diagram of a sequence 1400 of OFDM data units for providing buffer information to an access point, according to an embodiment. In the sequence 1400, a client station 25 generates a resource request MPDU 1402. In an embodiment, the resource request MPDU 1402 is similar to the MPDU 800 or MPDU 900. In the embodiment shown in FIG. 14, the client station 25 omits the frame body 816 from the resource request MPDU 1402. In an embodiment, the client station 25 uses a medium access procedure or backoff procedure to determine when to transmit the resource request MPDU 1402. In an embodiment, the backoff procedure is an enhanced distributed channel access (EDCA) backoff procedure (e.g., shared with single user EDCA traffic). In an embodiment, the backoff procedure is a backoff procedure specific to OFDMA. After a suitable backoff period 1404, the client station 25 transmits the resource request MPDU 1402 to the access point 14. In an embodiment, the client station 25 transmits the resource request MPDU 1402 via allocated or assigned radio resources, for example, an allocated sub-channel of an OFDM communication channel. In an embodiment, the access point 14 generates and transmits an acknowledgment frame 1406 in response to a successful receipt of the resource request MPDU 1402.

Figure 15:
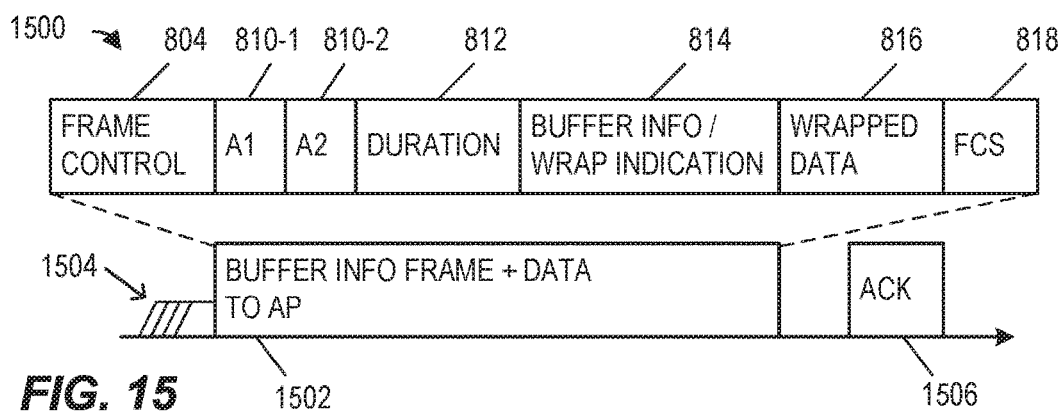
FIG. 15 is a diagram of an example sequence of OFDM data units for providing buffer information and data to an access point, according to an embodiment.

FIG. 15 is a diagram of a sequence 1500 of OFDM data units for providing buffer information and data to an access point, according to an embodiment. In the sequence 1500, a client station 25 generates a resource request MPDU 1502. In an embodiment, the resource request MPDU 1502 is similar to the MPDU 800 or MPDU 900. In the embodiment shown in FIG. 15, the client station 25 includes a wrapped MPDU within the frame body 816, as described above with respect to FIG. 8 and FIG. 9. The client station 25 transmits the resource request MPDU 1502 after a backoff period 1504, in a similar manner as described above with respect to FIG. 14. In an embodiment, the access point 14 generates and transmits an acknowledgment frame 1506 in response to a successful receipt of the resource request MPDU 1502. In an embodiment, the acknowledgment frame 1506 is a block acknowledgment for the buffer information and the wrapped MPDU.

Figure 16:
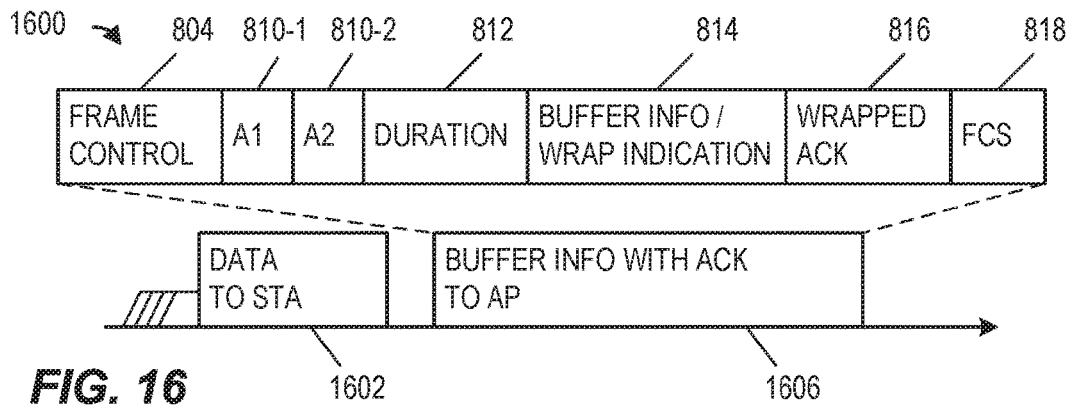
FIG. 16 is a diagram of an example sequence of OFDM data units for providing buffer information and an acknowledgment to an access point, according to an embodiment.

FIG. 16 is a diagram of a sequence 1600 of OFDM data units for providing buffer information and an acknowledgment to an access point, according to an embodiment. In the sequence 1600, a client station 25 receives a data MPDU 1602. In an embodiment, the client station 25 generates and transmits a resource request MPDU 1606 in response to a successful receipt of the data MPDU 1602. In an embodiment, the resource request MPDU 1606 is similar to the MPDU 800 or MPDU 900. In the embodiment shown in FIG. 16, the client station 25 includes a wrapped MPDU within the frame body 816, as described above with respect to FIG. 8 and FIG. 9. In the embodiment shown in FIG. 16, the wrapped MPDU within the frame body 816 is an acknowledgment control frame that indicates whether the data MPDU 1602 was successfully received. In an embodiment, the resource request and an acknowledgement (or block acknowledgment) are transmitted. In an embodiment, the client station 25 transmits the resource request MPDU 1606 via allocated or assigned radio resources, for example, an allocated sub-channel of an OFDM communication channel.

Figure 17:
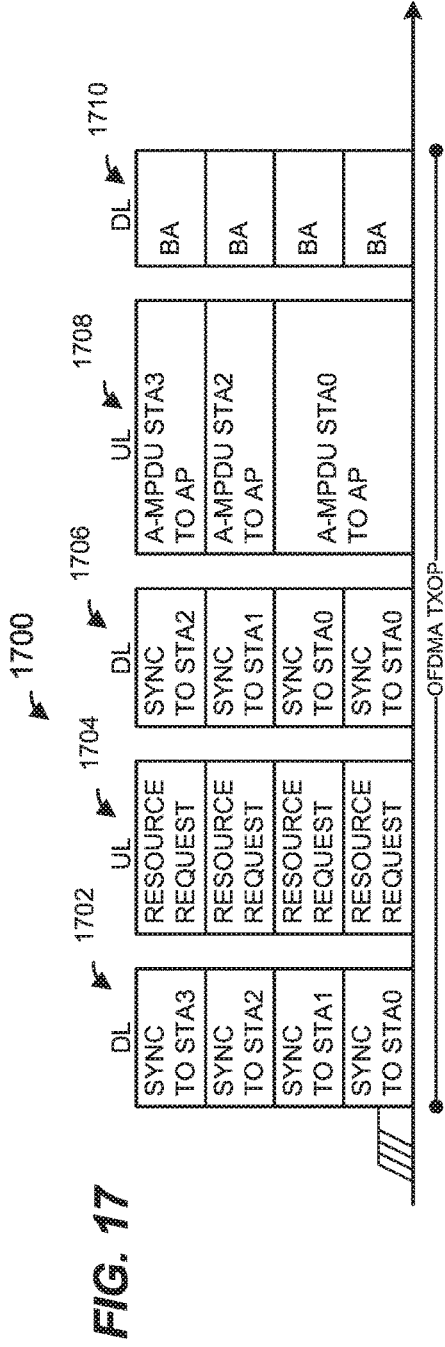
FIG. 17 is a diagram of an example sequence of an orthogonal frequency division multiple access (OFDMA) frame exchange for an access point that requests buffer information from multiple stations, according to an embodiment.

FIG. 17 is a diagram of a sequence 1700 of an OFDMA frame exchange for an access point that requests buffer information from multiple stations, according to an embodiment. The sequence 1700 includes downlink OFDMA data units 1702, 1706, and 1710, which are transmitted by the AP 14 to multiple client stations 25 (e.g., client stations STA0, STA1, STA2, and STA3), and also includes uplink OFDMA data units 1704 and 1708, which are transmitted by at least some of the multiple client stations to the AP 14 in response to the downlink OFDMA data units 1702 and 1706, in an embodiment.

In an embodiment, the OFDMA data unit 1702 corresponds to a scheduling frame (SYNC) for the multiple client stations STA0, STA1, STA2, and STA3. In an embodiment, the scheduling frame (SYNC) is transmitted in a legacy duplicated PPDU. In an embodiment, the scheduling frame (SYNC) is transmitted in a VHT or HE PPDU. In an embodiment, the scheduling frame (SYNC) is transmitted in a downlink (DL) MU-MIMO PPDU or DL MU OFDMA PPDU. In an embodiment, the scheduling frame is a resource allocation message that i) indicates an allocation of sub-channels to each of the multiple client stations, and ii) requests buffer information from the multiple client stations. In response to the scheduling frame, each of the multiple client stations STA0, STA1, STA2, and STA3 transmits an OFDM data unit 1704-1, 1704-2, 1704-3, and 1704-4, respectively, via sub-channels indicated in the scheduling frame. In an embodiment, one or more of the OFDM data units 1704-1, 1704-2, 1704-3, and 1704-4 include the MPDU 800 or MPDU 900. For example, the OFDMA data unit 1704 provides buffer information from the multiple client stations 25 to the access point 14. In an embodiment, the AP 14 allocates the sub-channels to the client stations STA0, STA1, and STA2 and indicates a PPDU length for the OFDMA data unit 1704 that allows for only a QoS null MPDU (i.e., the MPDU 800 or the MPDU 900 with an omitted frame body).

The AP 14 determines a radio resource allocation based on the buffer information from the multiple client stations and generates a scheduling frame. In the embodiment shown in FIG. 17, the AP 14 generates and transmits the OFDMA data unit 1706, which corresponds to a scheduling frame (SYNC) for the client stations STA0, STA1, and STA2. In an embodiment, the scheduling frame is a resource allocation message that indicates an allocation of sub-channels to the client stations STA0, STA1, and STA2. In response to the scheduling frame, the client stations STA0, STA1, and STA2 transmit data A-MPDUs within OFDM data units 1708-1, 1708-2, and 1708-3, respectively, via sub-channels indicated in the OFDMA data unit 1706. The AP 14 transmits the OFDMA data unit 1710 in response to the OFDMA data unit 1708 to acknowledge receipt, in an embodiment. For example, the AP 14 generates the OFDMA data unit 1710 to include a block acknowledgement for each of the client stations STA0, STA2, and STA3.

Figure 18:
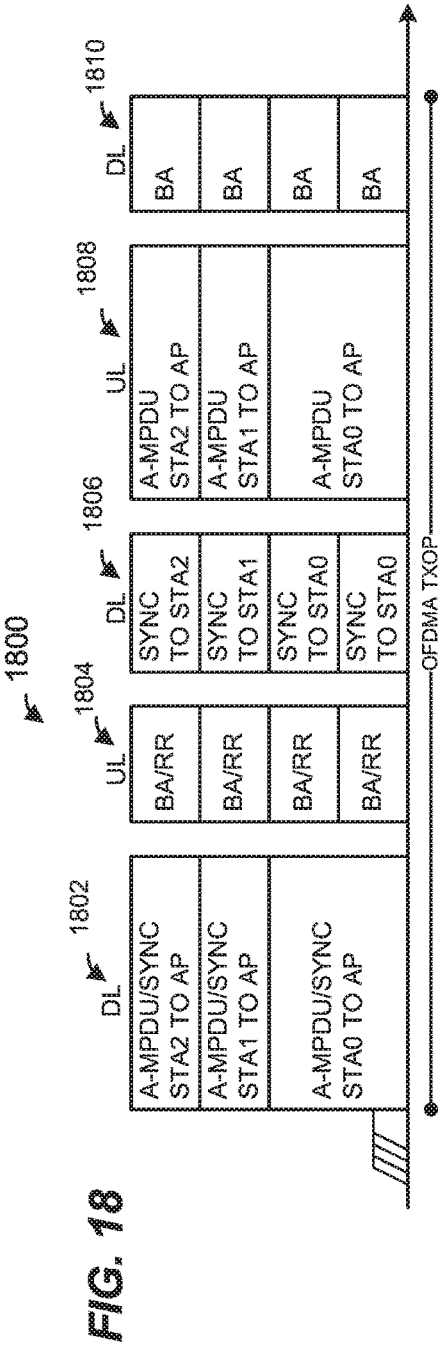
FIG. 18 is a diagram of an example sequence of OFDMA data units for an access point that requests buffer information from multiple stations, according to another embodiment.

FIG. 18 is a diagram of a sequence 1800 of an OFDMA frame exchange for an access point that requests buffer information from multiple stations, according to another embodiment. The sequence 1800 includes downlink OFDMA data units 1802, 1806, and 1810, which are transmitted by the AP 14 to multiple client stations 25 (e.g., client stations STA0, STA1, and STA2), and also includes uplink OFDMA data units 1804 and 1808, which are transmitted by at least some of the multiple client stations to the AP 14 in response to the downlink OFDMA data units 1802 and 1806, in an embodiment.

In an embodiment, the OFDMA data unit 1802 corresponds to an A-MPDU that includes data frames and a scheduling frame (SYNC) for the multiple client stations STA0, STA1, and STA2. In an embodiment, the scheduling frame is a resource allocation message that requests buffer information from the multiple client stations. In response to the scheduling frame, each of the multiple client stations STA0, STA1, and STA2 transmits an OFDM data unit 1804-1, 1804-2, and 1804-3, respectively, via sub-channels indicated in the scheduling frame. In an embodiment, one or more of the OFDM data units 1804-1, 1804-2, and 1804-3 include a block acknowledgment to the corresponding A-MPDU received from the AP 14 and one of the MPDU 800 or MPDU 900 for a buffer information report.

The AP 14 determines a radio resource allocation based on the buffer information from the multiple client stations and generates a scheduling frame. In the embodiment shown in FIG. 18, the AP 14 generates and transmits the OFDMA data unit 1806, which corresponds to a scheduling frame (SYNC) for the client stations STA0, STA1, and STA2. In an embodiment, the scheduling frame is a resource allocation message that indicates an allocation of sub-channels to the client stations STA0, STA1, and STA2. In response to the scheduling frame, the client stations STA0, STA1, and STA2 transmit data A-MPDUs within OFDM data units 1808-1, 1808-2, and 1808-3, respectively, via sub-channels indicated in the OFDMA data unit 1806. The AP 14 transmits the OFDMA data unit 1810 in response to the OFDMA data unit 1808 to acknowledge receipt, in an embodiment. For example, the AP 14 generates the OFDMA data unit 1810 to include a block acknowledgement for each of the client stations STA0, STA1, and STA2.

Figure 19:
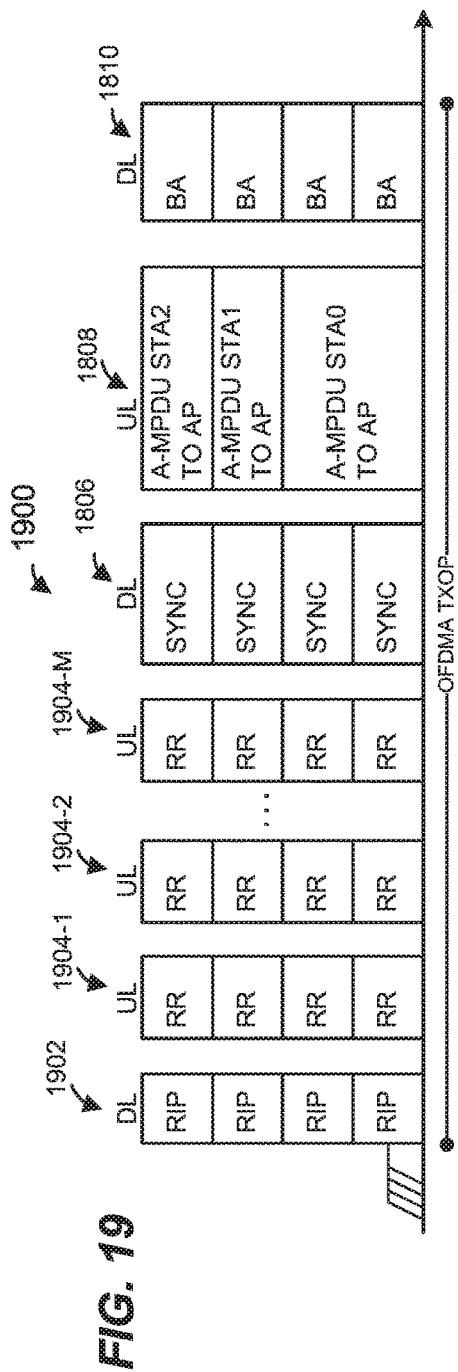
FIG. 19 is a diagram of an example sequence of OFDMA data units for an access point that requests buffer information from multiple stations, according to yet another embodiment.

FIG. 19 is a diagram of a sequence 1900 of an OFDMA frame exchange for an access point that requests buffer information from multiple client stations, according to yet another embodiment. The sequence 1900 is similar to the sequence 1800, but in the embodiment of FIG. 19, the AP 14 utilizes a broadcast resource information polling (RIP) frame 1902 to request the buffer information. The broadcast RIP frame 1902 includes an association identifier (AID) for each of the multiple client stations, for example, in a frame body of the broadcast RIP frame 1902. For example, the broadcast RIP frame 1902 includes M association identifiers, where M is an integer. In response to the broadcast RIP frame 1902, each of the multiple client stations provides a respective resource request MPDU 1904-1, 1904-2, . . . 1904-M. In an embodiment, the resource request MPDU 1904 corresponds to one of the resource request MPDU 800 or 900. In the embodiment shown in FIG. 19, each of the multiple client stations responds in an order of the association identifiers within the broadcast RIP frame 1902. In other embodiments, another suitable order for the resource request MPDUs 1904 is utilized.

Figure 20:
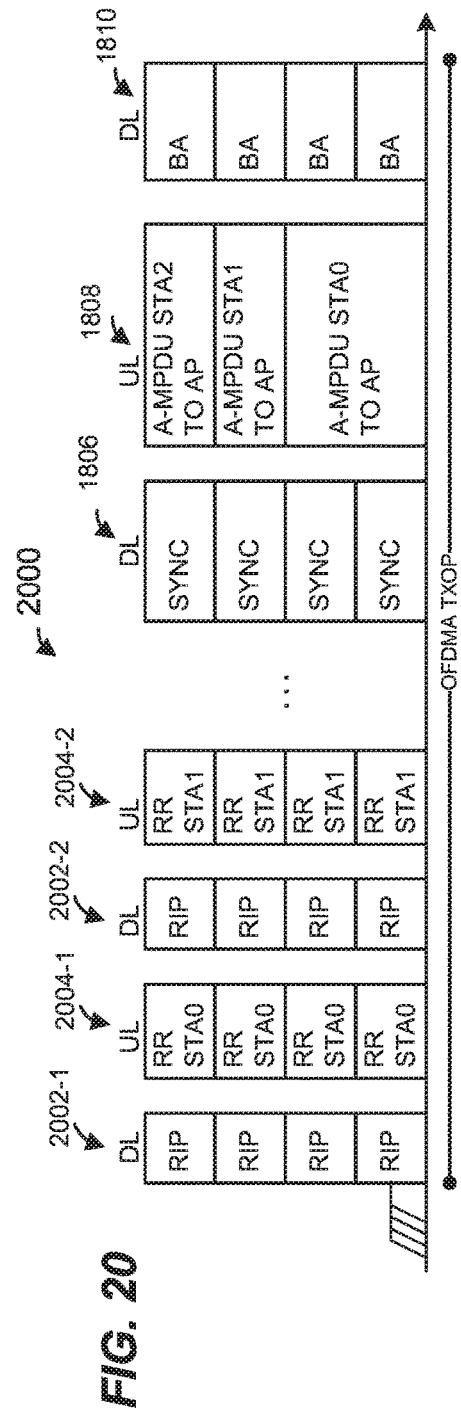
FIG. 20 is a diagram of an example sequence of OFDMA data units for an access point that requests buffer information from multiple stations, according to another embodiment.

FIG. 20 is a diagram of a sequence 2000 of an OFDMA frame exchange for an access point that requests buffer information from multiple client stations, according to another embodiment. The sequence 2000 is similar to the sequence 1800, but in the embodiment of FIG. 20, the AP 14 utilizes a plurality of M unicast resource information polling (RIP) frames 2002 to request the buffer information from M client stations, where M is an integer. In an embodiment, each of the M unicast RIP frames 2002 includes an association identifier (AID) for one of the client stations, for example, in a frame body of the unicast RIP frame 2002. In response to the unicast RIP frame 2002, the corresponding client station provides a resource request MPDU 2004. In an embodiment, the resource request MPDU 2004 corresponds to one of the resource request MPDU 800 or 900. In some embodiments, the unicast RIP frame 2002 omits the frame body 816.

Figure 21:
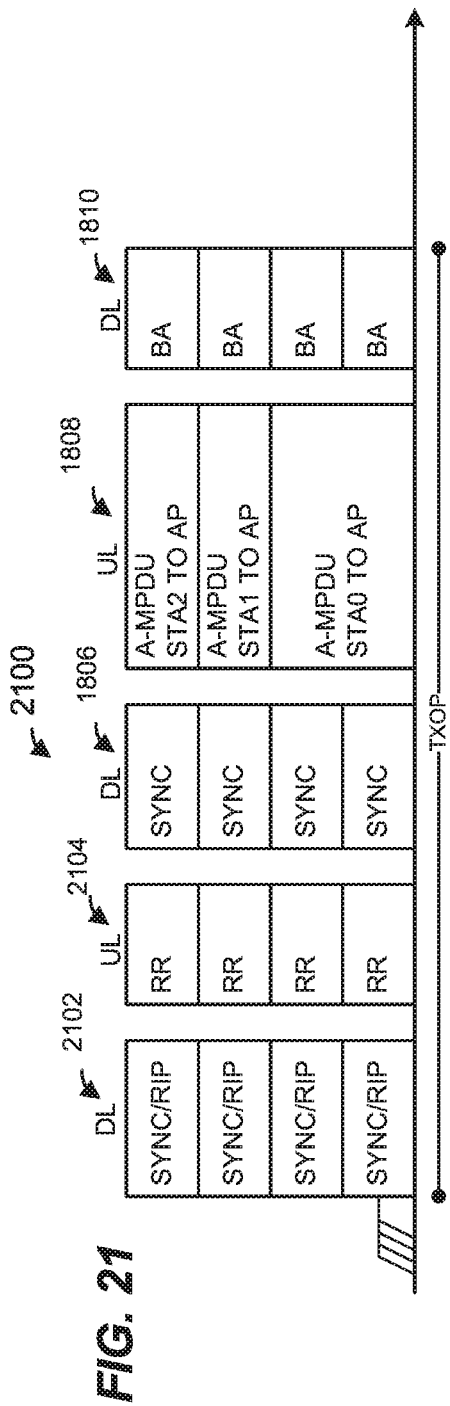
FIG. 21 is a diagram of an example sequence of OFDMA data units for an access point that requests buffer information from multiple stations, according to another embodiment.

FIG. 21 is a diagram of a sequence 2100 of an OFDMA frame exchange for an access point that requests buffer information from multiple client stations, according to yet another embodiment. The sequence 2100 is similar to the sequence 1800, but in the embodiment of FIG. 21, the AP 14 utilizes an OFDMA data unit to provide a resource information polling (RIP) frame 2102 to request the buffer information. In an embodiment, the RIP frame 2102 includes a RIP frame that wraps a scheduling or SYNC frame, in a manner similar to the wrapped MPDU described above with respect to FIG. 8. In this embodiment, the RIP frame 2102 includes a broadcast receiver address and the scheduling frame indicates the multiple client stations. In response to the RIP frame 2102, each of the multiple client stations indicated by the scheduling frame transmits a respective OFDM data unit 2104. In an embodiment, one or more of the OFDM data units 2104-1, 2104-2, and 2104-3 include the MPDU 800 or MPDU 900. In another embodiment, the resource request is indicated in a SYNC frame, so the separate RIP frame 2102 is not needed.

Figure 22:
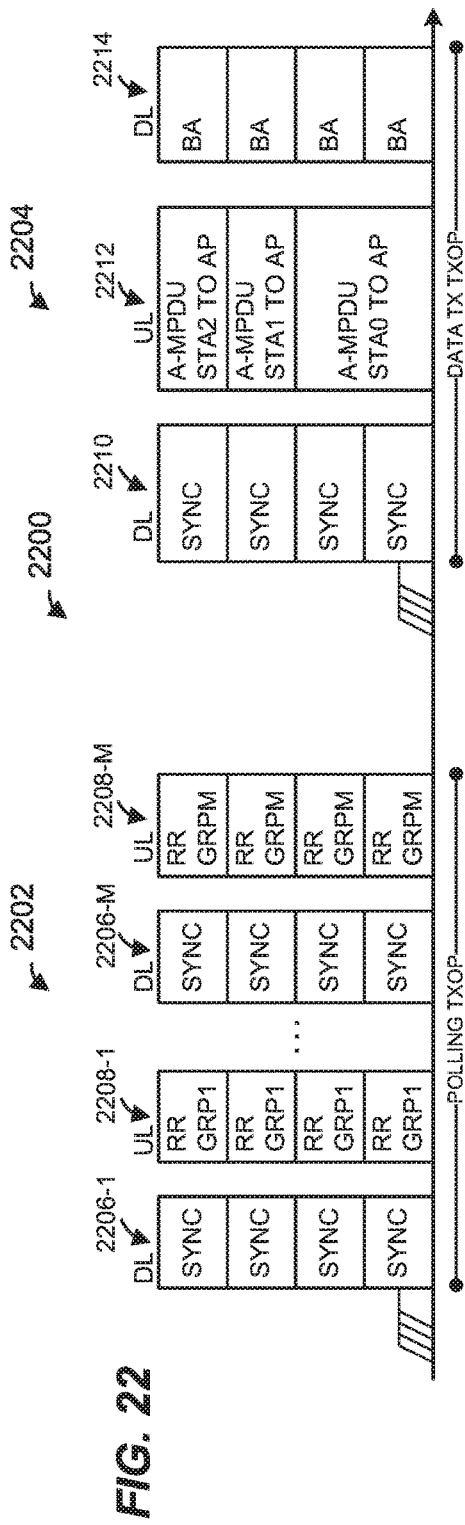
FIG. 22 is a diagram of an example sequence of OFDMA data units for a buffer information request utilizing separated polling, according to an embodiment.

FIG. 22 is a diagram of a sequence 2200 of an OFDMA exchange for a buffer information request utilizing separated polling, according to an embodiment. The sequence 2200 includes a polling TXOP 2202 and a data transfer TXOP 2204, in an embodiment. While only one polling TXOP 2202 and data transfer TXOP 2204 are shown, additional polling TXOPs are utilized prior to a data transfer TXOP 2204, or additional data transfer TXOPs are utilized after polling, in various embodiments. In some embodiments, the AP 14 groups a plurality of client stations into different OFDMA data units or different polling TXOPs for receiving the buffer information. In some embodiments, the AP 14 groups a plurality of client stations into different OFDMA data units or different data transmission TXOPs for receiving data transmissions from the client stations.

In the embodiment shown in FIG. 22, the AP 14 utilizes a plurality of M groups, where M is an integer, and transmits a respective OFDMA data unit 2206, including a scheduling frame, to each of the M groups to request the buffer information from M client stations (e.g., OFDMA data units 2206-1, 2206-2, . . . 2206-M). In various embodiments, each of the M groups includes one, two, three, or another suitable number of client stations. In an embodiment, each of the client stations of a same group transmits an OFDM data unit as part of an OFDMA data unit 2208 in response to the corresponding scheduling frame (e.g., OFDMA data units 2208-1, 2208-2, . . . 2208-M). In the embodiment shown in FIG. 22, the AP 14 transmits a non-HT duplicate data unit or OFDMA data unit 2206-1 to a first group of client stations where the non-HT duplicate data unit or OFDMA data unit 2206-1 includes the scheduling frame and, in response, the AP 14 receives the OFDMA data unit 2208-1 that includes resource request MPDUs (e.g., resource request MPDU 800 or 900) from the first group of client stations. The AP 14 repeats the transmission of the non-HT duplicate data unit or OFDMA data unit 2206 for each of the M groups and receives corresponding resource request MPDUs from the client stations. During the data transfer TXOP 2204, the AP 14 determines a radio resource allocation based on the buffer information from the multiple client stations and generates a scheduling frame. The AP 14 and client stations exchange UL OFDMA frame exchange shown by 2210, 2212, and 2214, in a manner similar to the exchange of OFDMA frame exchange shown by 1806, 1808, and 1810, as described above with respect to FIG. 18.

Figure 23:
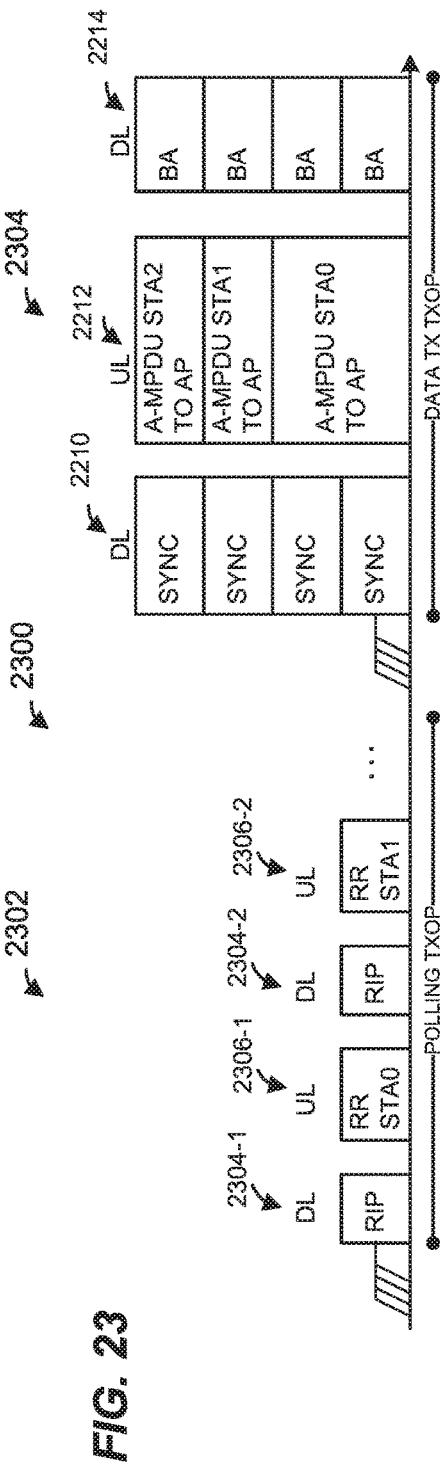
FIG. 23 is a diagram of an example sequence of OFDMA data units for a buffer information request utilizing separated polling, according to another embodiment.

FIG. 23 is a diagram of a sequence 2300 of an OFDMA exchange for a buffer information request utilizing separated polling, according to another embodiment. The sequence 2300 includes a polling TXOP 2302 and a data transfer TXOP 2304 that are similar to the polling TXOP 2202 and data transfer TXOP 2204 described above with respect to FIG. 22, in an embodiment. During, the polling TXOP 2302, the AP 14 utilizes a plurality of M unicast resource information polling (RIP) frames 2304 to request the buffer information from M client stations, where M is an integer. In an embodiment, each of the M unicast RIP frames 2304 includes an association identifier (AID) for one of the client stations, for example, in a frame body of the unicast RIP frame 2304. In response to the unicast RIP frame 2304, the corresponding client station provides a resource request MPDU 2306. In an embodiment, the resource request MPDU 2306 corresponds to one of the resource request MPDU 800 or 900. In some embodiments, the unicast RIP frame 2304 omits the frame body 816.

Figure 24:
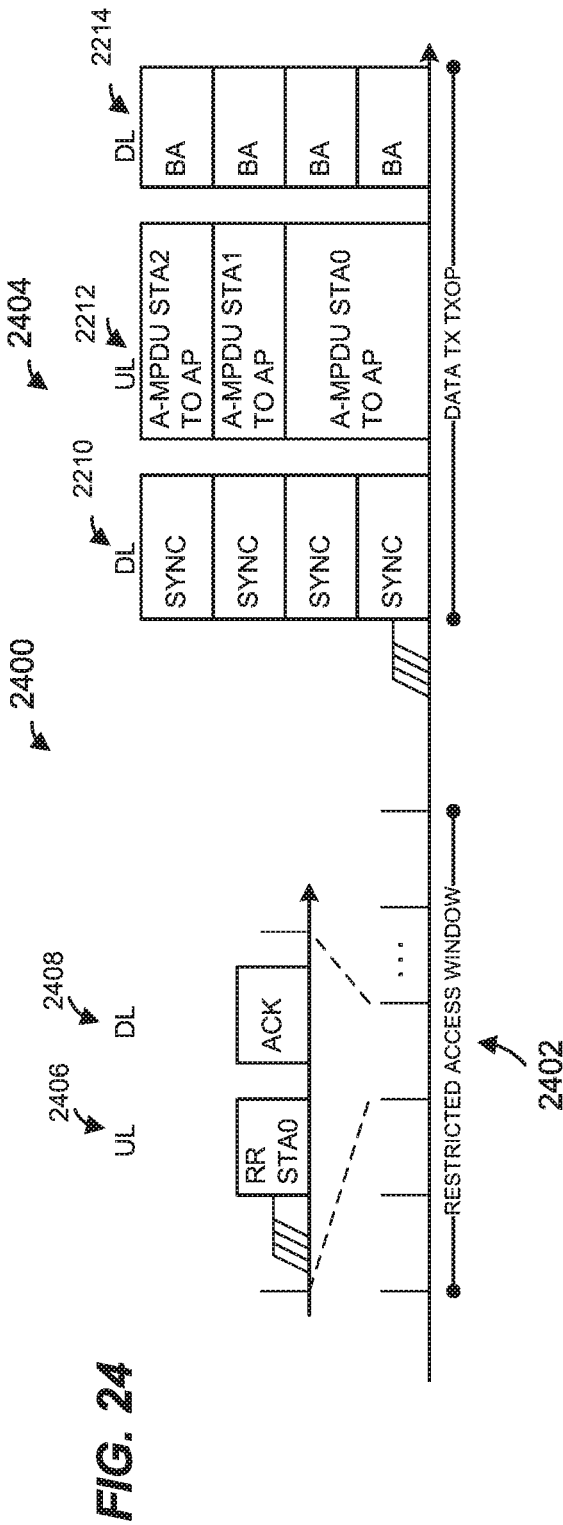
FIG. 24 is a diagram of an example sequence of OFDMA data units for a buffer information request within a restricted access window, according to an embodiment.

FIG. 24 is a diagram of a sequence 2400 of an OFDMA exchange for a buffer information request within a restricted access window, according to an embodiment. The sequence 2400 includes a restricted access window 2402 and a data transfer TXOP 2404. The data transfer TXOP 2404 is similar to the data transfer TXOP 2304, described above with respect to FIG. 23, in an embodiment. An example of a restricted access window is described in IEEE Draft Standard for Information Technology, Part 11: Wireless LAN Medium Access Control (MAC) and Physical Layer (PHY) Specifications, Amendment 6: Sub 1 GHz License Exempt Operation, 2013 ("the IEEE 802.11ah standard"), the disclosure of which is incorporated herein by reference in its entirety. For example, the restricted access window 2402 is divided into one or more time slots and the AP 14 assigns to each of the multiple client stations (or a group of client stations) a time slot, inside which the client stations are allowed to contend for medium access. During a time slot, a client station 25 contends for medium access by waiting for a suitable backoff period (e.g., similar to backoff period 1404), then exchanges a resource request MPDU 2406 and acknowledgment 2408 with the access point 14, in a manner similar to the resource request MPDU 1402 and acknowledgment 1406, described above with respect to FIG. 14.

Figure 25:
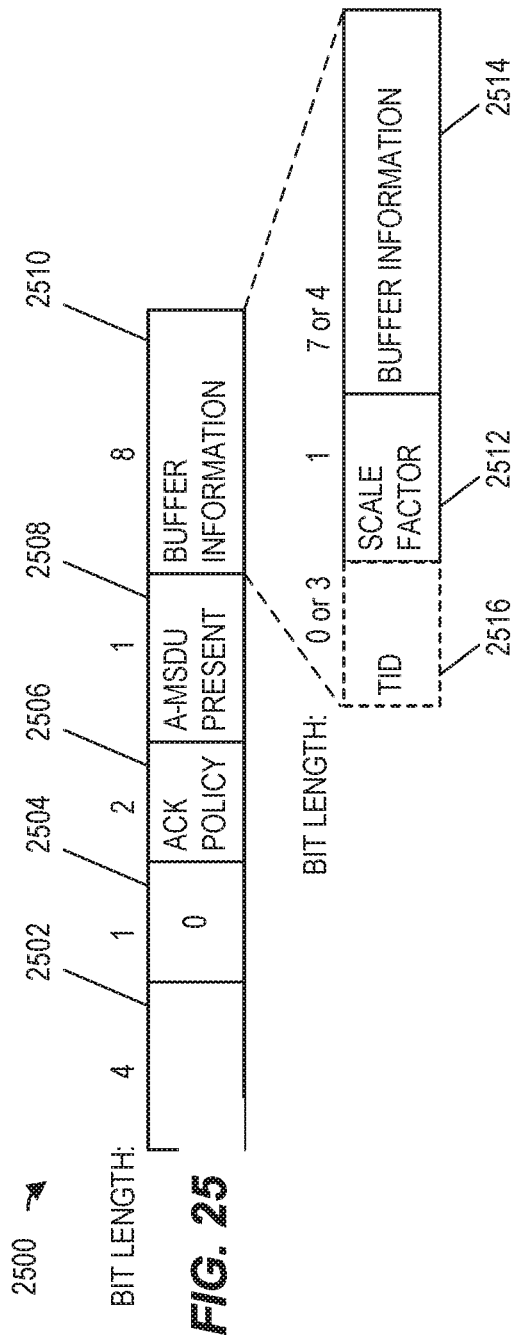
FIG. 25 is a diagram of an example quality of service (QoS) control field of an MPDU that includes a scale factor for buffer information, according to an embodiment.

FIG. 25 is a diagram of a quality of service (QoS) control field 2500 of an MPDU (not shown) that includes a scale factor for buffer information, according to an embodiment. In an embodiment, the MPDU is similar to the MPDU 700, but the QoS control field 2500 replaces the QoS control field 714. The QoS control field 2500 is based on the QoS control field for a QoS data frame and includes a TID subfield 2502 (bits 0-3), a zero subfield 2504 (bit 4), an acknowledgment policy subfield 2506 (bits 5-6), an A-MSDU present subfield 1508 (bit 7), and a resource request subfield 2510 (8 bits). The resource request subfield 2510 includes a scale factor subfield 2512 and a resource subfield 2514. In an embodiment, the scale factor subfield 2512 is similar to the scale factor subfield 822 and the resource subfield 2514 is similar to the resource subfield 824 (but with a bit length of 7 bits), as described above with respect to FIG. 8. In an embodiment, the resource request subfield 2510 further includes a resource request TID subfield 2516 that indicates a different TID corresponding to the resource subfield 2514. For example, the TID subfield 2502 indicates a first TID corresponding to a frame body of the MPDU that contains the QoS control field 2500 and the resource request TID subfield 2516 indicates a second TID corresponding to a resource request, where the first TID is different from the second TID. In an embodiment, the resource request TID subfield 2516 is 3 bits in length and the resource subfield 2514 is 4 bits in length (instead of 7 bits in length). In other embodiments, other suitable lengths for the resource request TID subfield and/or resource subfield 2514 are utilized.

Figure 26:
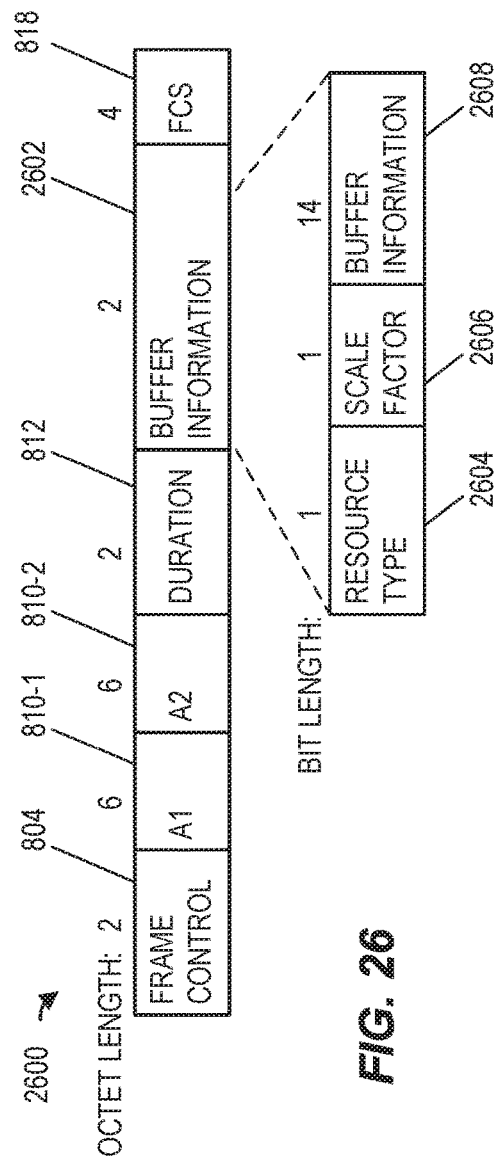
FIG. 26 is a diagram of an example MPDU that includes buffer information for a resource request, according to an embodiment.

FIG. 26 is a diagram of a resource request MPDU 2600 that includes buffer information for a resource request, according to an embodiment. The resource request MPDU 2600 includes the frame control field 804 (2 octets), the first address (A1) field 810-1 (6 octets), the second address (A2) field 810-2 (6 octets), the duration field (2 octets) 812, and a resource request field 2602 (2 octets), in an embodiment. In the embodiment shown in FIG. 26, the frame body 816 is omitted (e.g., a null data frame). The resource request field 2602 includes i) a resource type subfield 2604 that indicates whether the buffer information indicates the number of bytes or the TXOP duration, ii) a scale factor subfield 2606 that indicates a scale value, and iii) a resource subfield 2608 (or buffer information indication) that indicates a base resource value. The scale factor subfield 2606 and the resource subfield 2608 are similar to the scale factor subfield 822 and resource subfield 824, respectively, as described above with respect to FIG. 8.

Figure 27:
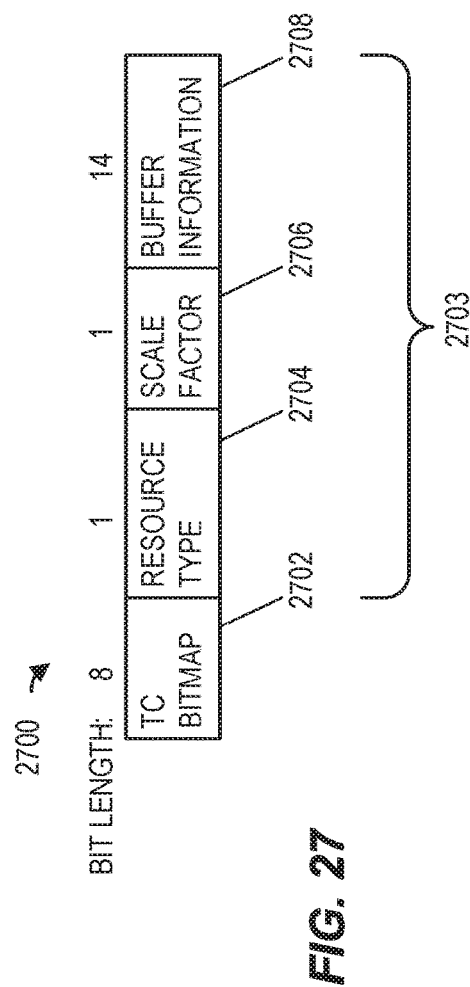
FIG. 27 is a diagram of an example MPDU that includes buffer information for multiple resource requests, according to another embodiment.

FIG. 27 is a diagram of a resource request field 2700 that includes buffer information for multiple resource requests, according to another embodiment. For example, the resource request field 2700 replaces the resource request field 2602 of the resource request MPDU 2600. In the illustrated embodiment, the resource request field 2700 includes a bitmap subfield 2702 and a resource subfield 2703. In other embodiments, the resource request field 2700 includes a plurality of instances (not shown) of the resource subfield 2703. For example, the bitmap subfield 2702 is similar to the bitmap subfield 904 (described above with respect to FIG. 9) and indicates which data groups of a plurality of data groups correspond to a resource subfield included in the resource request field 2700. The resource subfield 2703 includes i) a resource type subfield 2704 that indicates whether the buffer information indicates the number of bytes or the TXOP duration, ii) a scale factor subfield 2706 that indicates a scale value, and iii) a resource subfield 2708 (or buffer information indication) that indicates a base resource value. The scale factor subfield 2706 and the resource subfield 2708 are similar to the scale factor subfield 822 and resource subfield 824, respectively, as described above with respect to FIG. 8.

Figure 28:
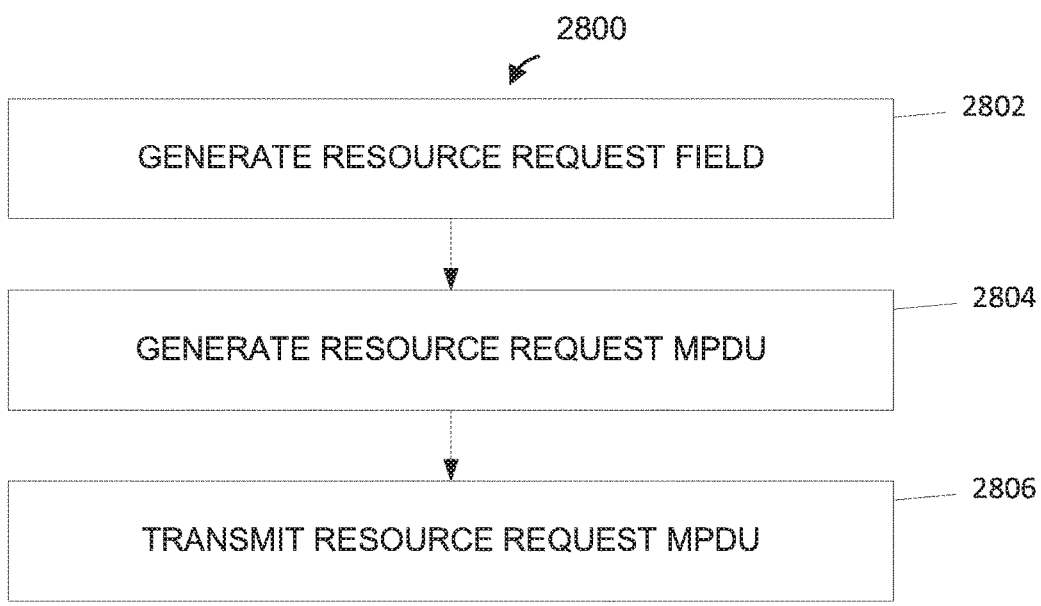
FIG. 28 is a flow diagram of an example method for transmitting a resource request for an OFDMA transmission, according to an embodiment.

FIG. 28 is a flow diagram illustrating an example method 2800 for transmitting a resource request for an OFDMA transmission, according to an embodiment. In an embodiment, the method 2800 is implemented by a client station in the WLAN, according to an embodiment. With reference to FIG. 1, the method 2800 is implemented by the network interface device 27, in an embodiment. For example, in one such embodiment, the PHY processor 29 is configured to implement the method 2800. According to another embodiment, the MAC processing 28 is also configured to implement at least a part of the method 2800. With continued reference to FIG. 1, in yet another embodiment, the method 2800 is implemented by the network interface device 16 (e.g., the PHY processor 20 and/or the MAC processor 18). In other embodiments, the method 2800 is implemented by other suitable network interfaces.

At block 2802, a resource request field is generated by a first communication device. In an embodiment, the resource request field indicates buffer information corresponding to queued media access control (MAC) protocol data units (MPDUs) that are queued for transmission by the first communication device. The resource request field includes i) a scale factor subfield that indicates a scale value, and ii) a resource subfield that indicates a base resource value, in an embodiment. The buffer information is i) a number of bytes indicated by the scale value multiplied by the base resource value, or ii) a transmission opportunity (TXOP) duration indicated by the scale value multiplied by the base resource value, in an embodiment. In an embodiment, the resource request field indicates whether the buffer information indicates the number of bytes or the TXOP duration.

In an embodiment, the resource request field includes a bitmap subfield that indicates which data groups of a plurality of data groups correspond to a resource subfield included in the resource request field. In an embodiment, the bitmap subfield includes a bit for each of the plurality of data groups and the resource request field includes a respective resource subfield for each data group indicated by the bitmap subfield. In an embodiment, the data groups are i) traffic classes, or ii) access categories. In an embodiment, each of the respective resource subfields indicates whether the buffer information for the corresponding data group indicates the number of bytes or the TXOP duration. In an embodiment, the buffer information corresponds to a total number of queued MPDUs for a plurality of data groups.

In an embodiment, a wrapped MPDU field is generated that includes i) a wrapped type subfield that indicates a frame type of a wrapped MPDU, and ii) a wrapped payload subfield that includes a payload for the wrapped MPDU. In this embodiment, a wrapper subfield is generated that indicates that the wrapped MPDU is included in the resource request MPDU, and the resource request MPDU is generated to include the resource request field and the wrapped MPDU. In this embodiment, the resource request MPDU is generated to include the resource request field and the wrapped MPDU. In an embodiment, the resource request MPDU includes a frame type subfield that indicates a frame type of the resource request MPDU, and the frame type of the wrapped MPDU is different from the frame type of the resource request MPDU. In an embodiment, the buffer information corresponds to a first data group and the wrapped MPDU corresponds to a second data group that is different from the first data group.

In an embodiment, the resource request information is in an HT variant HT Control field with a reserved bit in the HT variant Control field set to a value of 1 or other suitable value to indicate that the HT variant HT Control field includes the resource request information. In an embodiment, the resource request information is in a VHT variant Control field with a reserved bit in the VHT variant HT Control field set to a value of 1 or other suitable value to indicate that the VHT variant HT Control field includes the resource request information.

At block 2804, a resource request MPDU is generated that includes the resource request field by the first communication device.

At block 2806, the resource request MPDU is transmitted by the first communication device to a second communication device to request an allocation of radio resources for the OFDMA transmission by the second communication device. In an embodiment, the resource request MPDU is encapsulated in a PHY header by the PHY processor 20 or the PHY processor 29 prior to transmission.

In some embodiments, the first communication device receives a polling frame from the second communication device and generates the resource request MPDU in response to the polling frame. In an embodiment, the resource request field is a Quality of Service (QoS) control field and the resource request MPDU is a first QoS null MPDU. In an embodiment, an aggregate MPDU (A-MPDU) is generated by the first communication device. The A-MPDU includes the first QoS null MPDU and at least one other MPDU. In an embodiment, the at least one other MPDU includes a second QoS null MPDU. In this embodiment, the first QoS null MPDU corresponds to a first data group and the second QoS null MPDU corresponds to a second data group that is different from the first data group.

Figure 29:
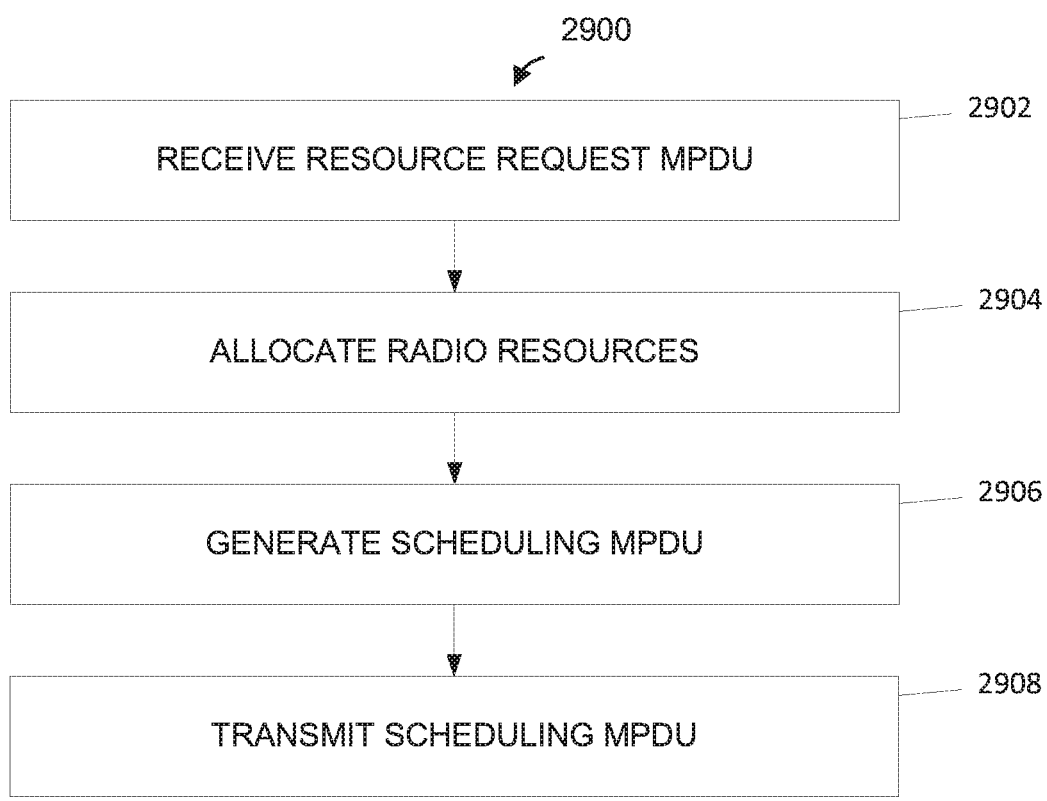
FIG. 29 is a flow diagram of an example method for allocating radio resources for an OFDMA transmission, according to an embodiment.

FIG. 29 is a flow diagram illustrating an example method for allocating radio resources for an OFDMA transmission, according to another embodiment. In an embodiment, the method 2900 is implemented by an access point in the WLAN, according to an embodiment. With reference to FIG. 1, the method 2900 is implemented by the network interface device 27, in an embodiment. For example, in one such embodiment, the PHY processor 29 is configured to implement the method 2900. According to another embodiment, the MAC processing 28 is also configured to implement at least a part of the method 2900. With continued reference to FIG. 1, in yet another embodiment, the method 2900 is implemented by the network interface device 16 (e.g., the PHY processor 20 and/or the MAC processor 18). In other embodiments, the method 2900 is implemented by other suitable network interfaces.

At block 2902, a resource request media access control (MAC) protocol data unit (MPDU) is received from a second communication device. In an embodiment, the resource request MPDU includes a resource request field that indicates buffer information corresponding to queued MPDUs that are queued for transmission by the second communication device. In an embodiment, the resource request field includes i) a scale factor subfield that indicates a scale value, and ii) a resource subfield that indicates a base resource value. In an embodiment, the resource request field is a Quality of Service (QoS) control field and the resource request MPDU is a first QoS null MPDU. In an embodiment, the resource request field is an HT variant HT Control field with a reserved bit in the HT variant HT Control field set to a value of 1 (or other suitable value) to indicate the resource request information. In another embodiment, the resource request field is a VHT variant HT Control field with a reserved bit in the VHT variant HT Control field set to a value of 1 (or other suitable value) to indicate the resource request information.

In an embodiment, the resource request field includes a bitmap subfield that indicates which data groups of a plurality of data groups correspond to a resource subfield included in the resource request field. In an embodiment, the bitmap subfield includes a bit for each of the plurality of data groups and the resource request field includes a respective resource subfield for each data group indicated by the bitmap subfield. In an embodiment, the first communication device determines the radio resources by multiplying the scale value by the base resource value.

In an embodiment, receiving the resource request MPDU includes receiving an aggregate MPDU (A-MPDU) that includes the first QoS null MPDU and at least one second QoS null MPDU. In this embodiment, generating the scheduling MPDU includes generating the scheduling MPDU to include an acknowledgment for the A-MPDU if at least one of the first QoS null MPDU or the at least one second QoS null MPDU has been correctly received.

At block 2904, radio resources are allocated by the first communication device to the second communication device for the OFDMA transmission based on the scale value and the base resource value.

At block 2906, a scheduling MPDU that indicates the radio resources allocated to the second communication device is generated by the first communication device.

At block 2908, the scheduling MPDU is transmitted by the first communication device to the second communication device. In an embodiment, the resource request MPDU is encapsulated in a PHY header by the PHY processor 20 or the PHY processor 29 prior to transmission.

Figure 30:
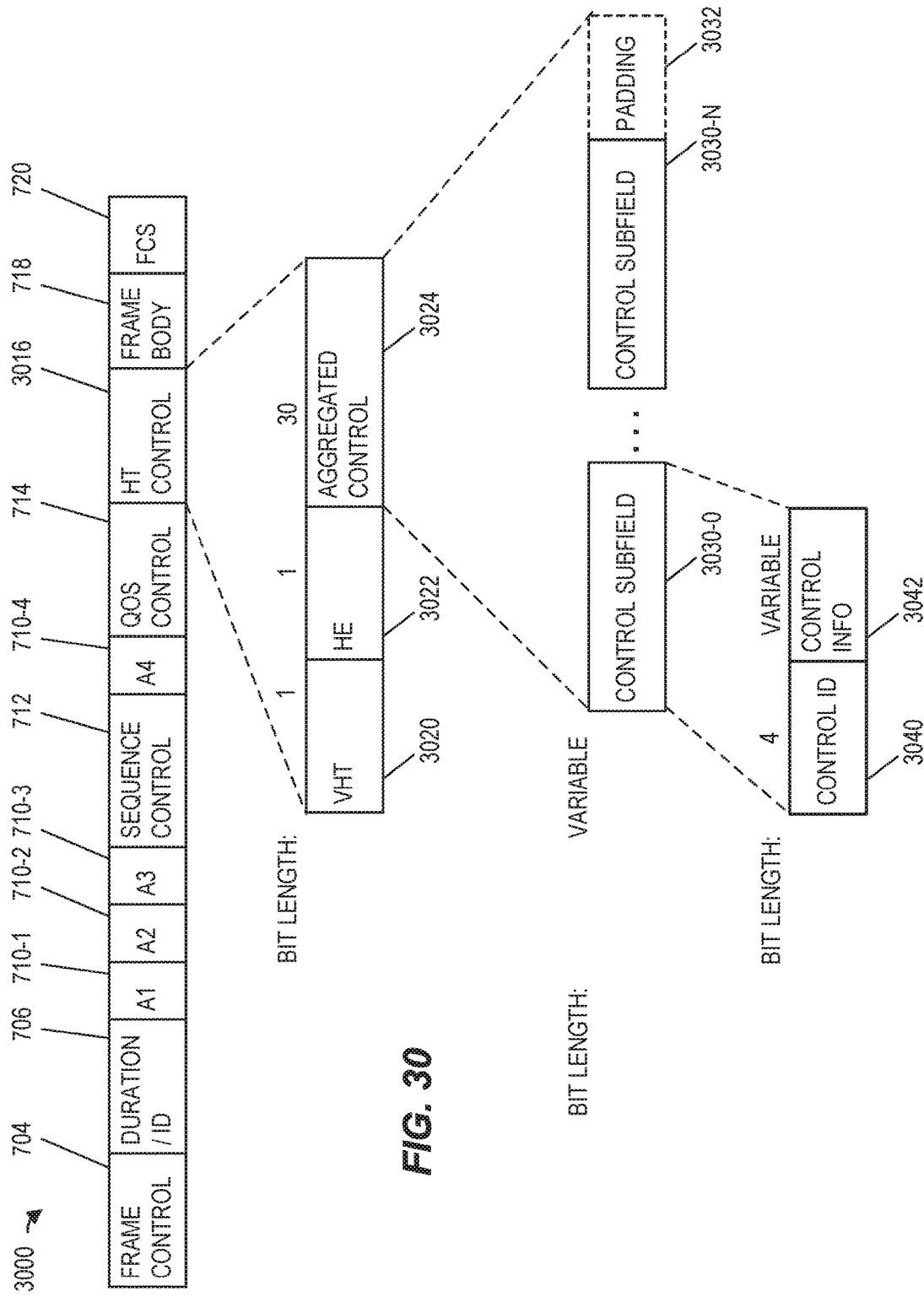
FIG. 30 is a diagram of an example MPDU that includes buffer information in an aggregated control subfield of a HT control field, according to an embodiment.

FIG. 30 is a diagram of an example MPDU 3000 that includes buffer information in an aggregated control subfield of a high throughput (HT) control field 3016, according to an embodiment. The MPDU 3000 is generally similar to the MPDU 700 and includes similar fields as shown, but an HT control field 3016 replaces the HT control field 716. In an embodiment, the client station 25 transmits a resource request to the AP 14 by generating the MPDU 3000 and transmitting the MPDU 3000 to the AP 14. In various embodiments, the MPDU 3000 is a data frame, control frame, management frame, or other suitable frame that repurposes the HT control field 3016 to include buffer information for a resource request. In various embodiments, the HT Control field is a high efficiency (HE) variant HT Control field. In one embodiment, the HE variant HT control field 3016 includes a very high throughput (VHT) indicator subfield 3020 (1 bit), an HE indicator subfield 3022, and an aggregated control subfield 3024 (30 bits).

The VHT indicator subfield 3020 generally corresponds to the VHT indicator field 1222, and thus indicates whether the format of the HT control field 3016 is based on an HT format or on a VHT format, as discussed above. Additionally, the HE indicator subfield 3022 indicates whether the format of the HT Control field is based on the VHT format or the HE format. In an embodiment, the VHT indicator subfield 3020 and the HE indicator subfield 3022, are set to a value of 1 (or other suitable value) to indicate that the HT Control field is an HE variant HT Control field. In this embodiment, the HE variant HT Control field 3016 includes the aggregated control field 3024, for example, instead of the fields 1224 and 1226 associated with the HT or VHT variants of the HT control field, described above.

In various embodiments, the aggregated control subfield 3024 includes one or more control subfields 3030 and optionally, one or more padding bits 3032 (e.g., to reach a total length of 30 bits for the aggregated control subfield 3024). In an embodiment, each control subfield 3030 includes a control ID subfield 3040 (4 bits) and a control information subfield 3042 (variable length), where the control ID subfield 3040 indicates a fixed length and format of the corresponding control information subfield 3042. In various embodiments, the client station 25 generates the control subfield 3030 to include buffer information corresponding to queued media access control (MAC) protocol data units (MPDUs) that are queued for transmission. For example, the control ID subfield 3040 indicates that the control information subfield 3042 includes the buffer information, and the control information subfield 3042 includes a resource subfield or status report subfield that indicates the number of bytes for the queued MPDUs.

Figure 31A:
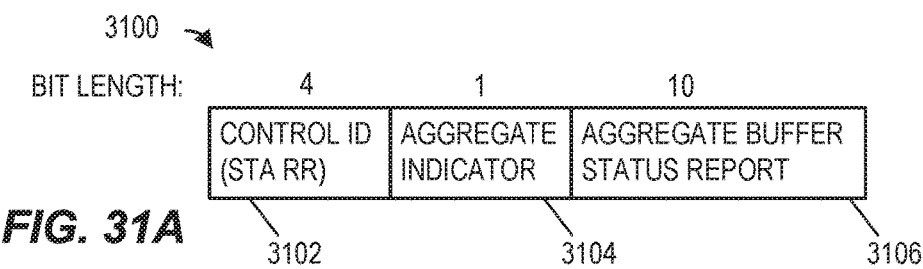
FIG. 31A and FIG. 31B are diagrams of two example control subfields, according to an embodiment.
Figure 31B:
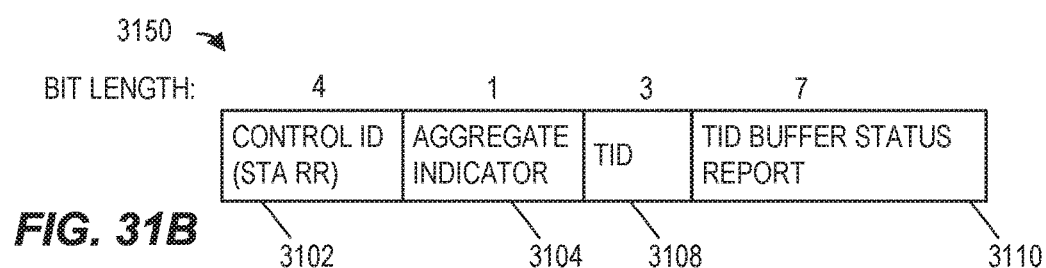

FIG. 31A and FIG. 31B are diagrams of two control subfields 3100 and 3150, according to an embodiment. The control subfield 3100 includes a control ID subfield 3102 (4 bits), an aggregate indicator subfield 3104 (1 bit), and a resource subfield 3106 (10 bits), in an embodiment. The control ID subfield 3102 generally corresponds to the control ID subfield 3040 and indicates a format of buffer information in the control subfield 3100. In an embodiment, the control ID subfield 3102 (bits 0 to 3) indicates that the format of the control subfield 3030 is a "short format" resource request having a length of 15 bits and the aggregate indicator 3104 (bit 4) indicates a format of the remaining 10 bits (bits 5 to 14).

In the scenario shown in FIG. 31A, the resource subfield 3106 is an aggregate buffer status report. For example, the aggregate indicator 3104 indicates (e.g., with a value of 1) that the buffer information is for an aggregate of a plurality of TIDs and that the resource subfield 3106 includes the aggregate buffer status report. In an embodiment, the aggregate buffer status report indicates a combined number of bytes for queued MPDUs for a plurality of TIDs, for example, as an aggregate of all TIDs for the client station 25.

Referring to FIG. 31B, the control subfield 3150 generally corresponds to the control subfield 3100, but in this scenario the aggregate indicator 3104 indicates (e.g., with a value of 0) that the buffer information is for a particular TID (i.e., a single TID instead of an aggregate of multiple TIDs). In this scenario, the control subfield 3150 includes a TID subfield 3108 (3 bits) and a TID buffer status report 3110 (7 bits) instead of the aggregate buffer status report. In an embodiment, the TID subfield 3108 indicates the particular TID (e.g., contains a TID value of 0, 1, 2, or other TID value) and the TID buffer status report 3110 indicates the number of bytes for the queued MPDUs for the particular TID. In an embodiment, the client station 25 selects the TID having a highest user priority with a non-zero buffer status as the particular TID. Although the TID subfield 3108 and the TID buffer status report 3110 have lengths of 3 bits and 7 bits, respectively, in the illustrated embodiment, in other embodiments, the TID subfield 3108 and the TID buffer status report 3110 have other suitable lengths, for example, 4 bits and 6 bits. In various embodiments, the client station 25 selects a value of the TID subfield 3108 having the corresponding length (i.e., 3 bits as shown in FIG. 31B) based on a 4-bit TID value (e.g., values from 0 to 15). In an embodiment, the TID subfield 3108 includes only the three most significant bits of a 4-bit TID value. In another embodiment, the TID subfield 3108 includes only the three least significant bits of a 4-bit TID value. In other embodiments, the client station 25 selects a different suitable value to represent the 4-bit TID value.

In the embodiment shown in FIGS. 31A and 31B, the control subfields 3100 and 3150 each have a length of 15 bits. In one scenario, the client station 25 includes two instances of the control subfield 3100 (i.e., 30 total bits) within the aggregated control field 3024. In another scenario, the client station 25 includes two instances of the control subfield 3150 (i.e., 30 total bits) within the aggregated control field 3024. In yet another scenario, the client station 25 includes one instance of the control subfield 3100 and one instance of the control subfield 3150 within the aggregated control field 3024.

In other embodiments, the control subfields 3100 and/or 3150 have different lengths. For example, the control subfields 3100 and 3150 each have a length of 30 bits (e.g., a "long format"). In this embodiment, the TID buffer status report has a length of 22 bits and the aggregate buffer status report has a length of 25 bits. In some embodiments, the control subfields 3100 and/or 3150 include an optional scale factor subfield (not shown) using one or more bits taken from the aggregate buffer status report 3106 or the TID buffer status report 3110. For example, the TID buffer status report 3110 has a length of 21 bits (long format) or 6 bits (short format) or the aggregate buffer status report has a length of 24 bits (long format) or 9 bits (short format). The scale factor subfield generally corresponds to the scale factor subfield 822, in an embodiment. In an embodiment where the scale factor subfield is omitted, the buffer status reports indicate the buffer information with a fixed granularity, for example, in multiples of 1 byte, 2 bytes, 4 bytes, 8 bytes, or other suitable values. In an embodiment where the scale factor subfield is included, the scale factor subfield indicates a variable granularity, for example, 4 bytes for a value of 0 and 64 bytes for a value of 1, or other suitable values.

Figure 32:
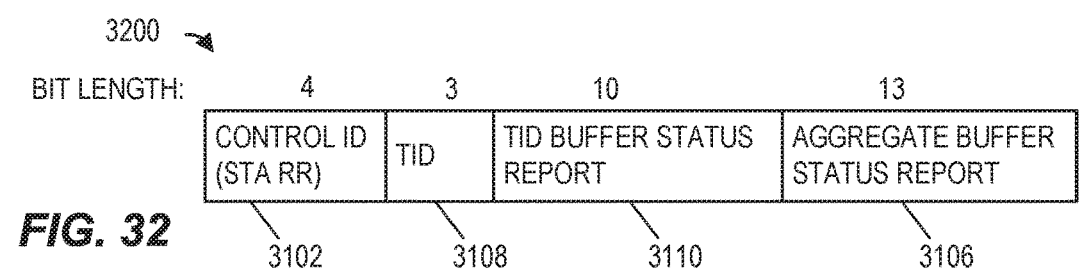
FIG. 32 is a diagram of an example control subfield, according to an embodiment.

FIG. 32 is a diagram of a control subfield 3200, according to an embodiment. The control subfield 3200 includes the control ID subfield 3102, the TID subfield 3108, the TID buffer status report 3110, and the aggregate buffer status report 3106, in an embodiment. In the illustrated embodiment of FIG. 32, the control ID subfield 3102 indicates that the format of the control subfield 3030 is a "combined format" that includes both aggregate buffer information and buffer information for a particular TID. In various embodiments, the bit lengths of the TID buffer status report 3110 and the aggregate buffer status report 3106 are increased so that the total length of the control subfield 3200 is 30 bits. In the embodiment shown in FIG. 32, the TID buffer status report 3110 has a length of 10 bits and the aggregate buffer status report 3106 has a length of 13 bits, for example, but other lengths are utilized in other embodiments. In an embodiment, the control subfield 3200 includes an optional scale factor subfield (not shown) using one or more bits taken from the aggregate buffer status report 3106 or the TID buffer status report 3110, as discussed above.

FIGS. 31A, 31B, and 32 show various formats for a resource request field. In some embodiments, a single format is defined and a single control ID value is reserved to indicate the single format for the resource request. In other embodiments, multiple formats are defined with respective control ID values that indicate the corresponding format for the resource request. For example, a first control ID value corresponds to the short format, a second control ID value corresponds to the long format, and a third control ID value corresponds to the combined format.

Figure 33:
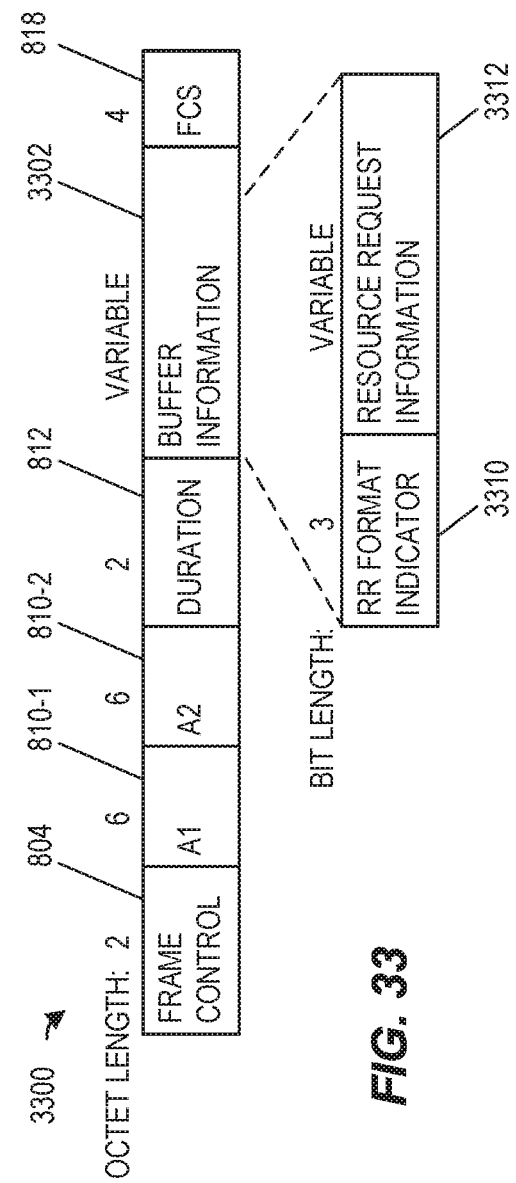
FIG. 33 is a diagram of an example MPDU that includes buffer information for a resource request field, according to an embodiment.

FIG. 33 is a diagram of an MPDU 3300 that includes buffer information for a resource request field 3302, according to an embodiment. The MPDU 3300 generally corresponds to the MPDU 2600, but includes a variable length resource request field 3302 in place of the resource request field 2602. The resource request field 3302 includes a resource request format indicator 3310 (3 bits) and a variable length resource request information subfield 3312, in various embodiments. In an embodiment, the client station 25 transmits a resource request to the AP 14 by generating the MPDU 3300 and transmitting the MPDU 3300 to the AP 14.

Figure 34A:
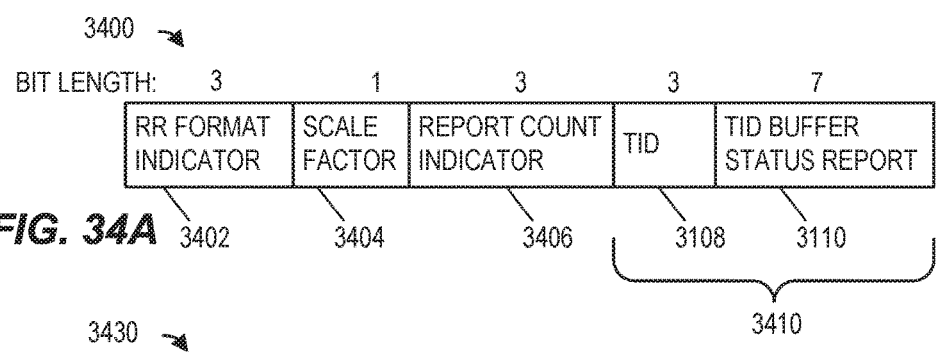
FIG. 34A, FIG. 34B, and FIG. 34C are example formats of a resource request field, according to various embodiments.
Figure 34B:
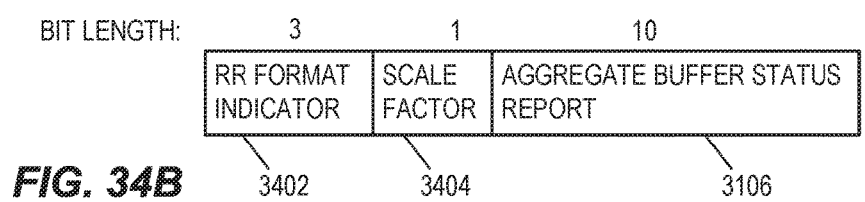
Figure 34C:
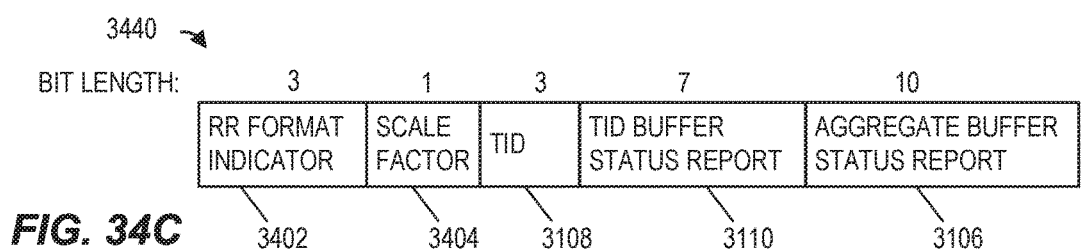

FIG. 34A, FIG. 34B, and FIG. 34C are formats of resource request fields 3400, 3430, and 3440, respectively, according to various embodiments. The client station 25 generates and includes one or more of the resource request fields 3400, 3430, and 3440 in the resource request field 3302, in various embodiments. Each of the resource request fields 3400, 3430, and 3440 includes a resource request format indicator 3402 (3 bits) and a scale factor subfield 3404 (1 bit). A value of the resource request format indicator 3402 indicates a format of buffer information in the corresponding resource request field, in an embodiment. For example, a first value corresponds to the resource request field 3400, a second value corresponds to the resource request field 3430, and a third value corresponds to the resource request field 3440. In some embodiments, additional formats of buffer information (e.g., formats described with respect to FIG. 8, 9A, 12, 25, 26, or 30) correspond to additional values of the resource request format indicator 3402. The scale factor subfield 3404 generally corresponds to the scale factor subfield 822, in an embodiment. In various embodiments, the scale factor has a length of 1 bit or multiple bits (e.g., 2 bits, 3 bits, or more). In some embodiments, the scale factor subfield 3404 is omitted.

The resource request field 3400 includes buffer information for one or more particular TIDs, in an embodiment. The resource request field 3400 includes a report count indicator subfield 3406 (3 bits) and one or more TID requests 3410 (10 bits), in the embodiment shown in FIG. 34A. The report count indicator subfield 3406 indicates a number of instances of the TID request 3410 included in the resource request field 3400, for example, one, two, three, or more TID requests, in various embodiments. In an embodiment, each TID request 3410 includes a respective TID subfield 3108 and a respective TID buffer status report 3110. In the illustrated embodiment, the TID buffer status report 3110 has a length of 7 bits, but has a shorter or longer length in other embodiments.

The resource request field 3430 includes buffer information for an aggregate of a plurality of TIDs, in an embodiment. The resource request field 3430 includes the aggregate buffer status report 3106, in an embodiment. In the illustrated embodiment, the aggregate buffer status report 3110 has a length of 10 bits, but has a shorter length or longer length in other embodiments.

The resource request field 3440 includes buffer information for both a particular TID and for an aggregate of a plurality of TIDs, in an embodiment. In the illustrated embodiment, the resource request field 3440 includes the aggregate buffer status report 3106, the TID subfield 3108, and the TID buffer status report 3110. In other embodiments, the resource request subfield 3440 also includes the report count indicator 3406 and multiple instances of the TID requests 3410, similar to the resource request field 3400.

In various embodiments, the client station 25 selects a format of a resource request frame to send a resource request to the AP 14. For example, the client station 25 selects from the formats described with respect to FIG. 8, 9A, 12, 25, 26, 30, or 33. Accordingly, the client station 25 reports a current buffer status in a per-TID manner (e.g., FIG. 31B or 34A), an aggregate of all TIDs (e.g., FIG. 31A or 34B), or in a combined per-TID and aggregate manner (e.g., FIG. 32 or 34C), in various embodiments. In an embodiment, when client station 25 has a buffer status that is non-zero, the client station 25 sends its buffer status report to request an allocation of uplink resources, and when the client station 25 has a buffer status that is zero, the client station sends a zero aggregated All-TID report (e.g., an aggregated buffer status report with a value of zero).

In an embodiment, the buffer resource report includes an access category (AC) buffer report field and an aggregate buffer report field (for multiple ACs). In an embodiment, when the AP device 14 supports a single TID A-MPDU, a client station reports buffer information for one TID that belongs to an AC via the AC buffer report field. In an embodiment, when the AP device 14 support a multi-TID A-MPDU, a client station reports buffer information for multiple TIDs that belong to an AC via the AC buffer report field. In an embodiment, when the AP device 14 support multi-TID A-MPDU, a client station reports buffer information for multiple TIDs that belongs to multiple ACs via an aggregate buffer report field (for multiple ACs).

The AP 14 receives the resource request frame from the client station 25, in various embodiments. In some embodiments, the AP 14 polls the client station 25 to request the client station 25 to send a resource request frame. For example, the AP 14 transmits the broadcast RIP frame 1902 or other suitable frame to one or more client stations 25. In an embodiment, when the AP 14 receives the non-zero buffer status report, the AP 14 processes the buffer status report as an uplink allocation request, and when the AP 14 receives the zero aggregated All-TID report, the AP 14 processes the buffer status report as indicating that no more uplink traffic is pending at the client station 25 and resets corresponding counters for UL resource requests for the client station 25.

In an embodiment, the AP 14 tracks the UL resource requests for a particular client station 25 on a per-TID basis, an aggregate basis, or both a per-TID basis and aggregate basis, for example, based upon whether the AP 14 and/or client station 25 support the per-TID basis and/or the aggregate basis. In an embodiment, when the AP 14 receives a new non-zero buffer status report, the AP 14 uses corresponding buffer values indicated in the buffer status report to replace existing records of the buffer values, and when an UL transmission from the client station 25 is successfully received, the AP 14 subtracts the data size of the UL transmission from the corresponding record of the buffer value for the client station 25. In some embodiments, the AP 14 schedules UL allocations for client stations based on the per-TID resource requests, for example, by scheduling client stations with buffered higher priority traffic before client stations with lower priority traffic.

Figure 35:
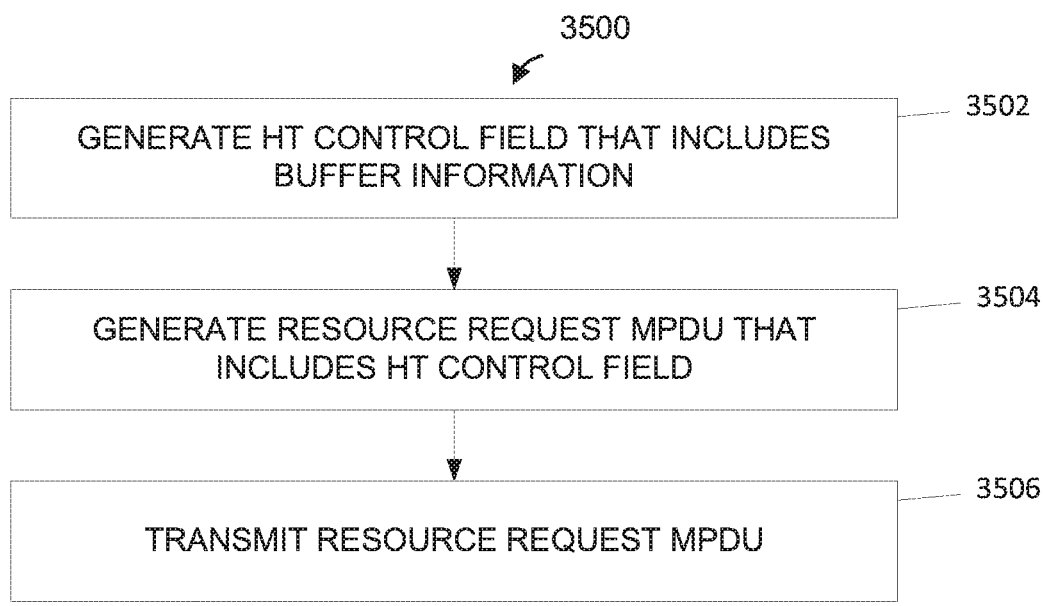
FIG. 35 is a flow diagram of a method for transmitting a resource request for an uplink (UL) multi-user (MU) transmission, according to an embodiment.

FIG. 35 is a flow diagram of a method 3500 for transmitting a resource request for an UL MU transmission (e.g., UL OFDMA and/or UL MU-MIMO transmission), according to an embodiment. In an embodiment, the method 3500 is implemented by an access point in the WLAN, according to an embodiment. With reference to FIG. 1, the method 3500 is implemented by the network interface device 27, in an embodiment. For example, in one such embodiment, the PHY processor 29 is configured to implement the method 3500. According to another embodiment, the MAC processing 28 is also configured to implement at least a part of the method 3500. With continued reference to FIG. 1, in yet another embodiment, the method 3500 is implemented by the network interface device 16 (e.g., the PHY processor 20 and/or the MAC processor 18). In other embodiments, the method 3500 is implemented by other suitable network interfaces.

At block 3502, a High Throughput (HT) Control field is generated by a first communication device, in an embodiment. The HT Control field includes buffer information corresponding to media access control (MAC) protocol data units (MPDUs) that are queued for transmission by the first communication device (e.g., "queued MPDUs") and the buffer information indicates a number of bytes for the queued MPDUs. In an embodiment, the first communication device is the client station 25.

In an embodiment, the HT Control field is the HE variant HT Control field 3016. The HE variant HT Control field includes i) a control ID subfield that indicates that the HE variant HT Control field includes the buffer information, and ii) a status report subfield that indicates the number of bytes for the queued MPDUs. In some embodiments, the control ID subfield is the control ID subfield 3102 and the status report subfield is the buffer status report 3106 or 3110. In an embodiment, the HE variant control field includes two instances of the control ID subfield: a first control ID subfield for a first buffer report and a second control ID subfield for a second buffer report. In this embodiment, the first buffer report provides different buffer information than the second buffer report, for example, the first buffer report provides buffer information for a particular TID and the second buffer report provides buffer information for a different TID or an aggregate buffer status report.

In some embodiments, the buffer information includes i) a scale factor subfield that indicates a scale value, and ii) a resource subfield that indicates a base resource value. In these embodiments, the number of bytes for the queued MPDUs corresponds to a number of bytes indicated by the scale value multiplied by the base resource value. In an embodiment, the scale factor subfield generally corresponds to the scale factor subfield 822 and the resource subfield corresponds to the buffer status report 3106 or 3110.

In some embodiment, the buffer information includes i) an aggregate subfield that indicates whether the buffer information is for a particular TID or for an aggregate of TIDs, and ii) a resource subfield that indicates a base resource value. For example, the aggregate subfield is the aggregate indicator 3104 and the resource subfield is the buffer status report 3106 or 3110. In this embodiment, when the aggregate subfield indicates that the buffer information is for the particular TID, the resource subfield indicates the number of bytes for the queued MPDUs for the particular TID, and the buffer information further includes a TID subfield (e.g., the TID subfield 3108) that indicates the particular TID. In this embodiment, when the aggregate subfield indicates that the buffer information is for the aggregate of TIDs, the resource subfield indicates a combined number of bytes for the queued MPDUs for a plurality of TIDs. In some embodiments, the buffer information has a combined format and includes i) a TID subfield that indicates a particular TID, ii) a first resource subfield that indicates the number of bytes for the queued MPDUs for the particular TID, and iii) an aggregate subfield that indicates a combined number of bytes for the queued MPDUs for a plurality of TIDs.

At block 3504, a resource request MPDU that includes the HT Control field is generated by the first communication device, in an embodiment. For example, the client station 25 generates the MPDU 3000 to include the HT Control field 3016.

At block 3506, the resource request MPDU is transmitted by the first communication device to a second communication device via a wireless communication channel to request an allocation of radio resources for the UL MU transmission by the second communication device. For example, the client station 25 transmits the MPDU 3000 to the AP 14 (e.g., along with transmissions by other client stations for the UL MU transmission).

Figure 36:
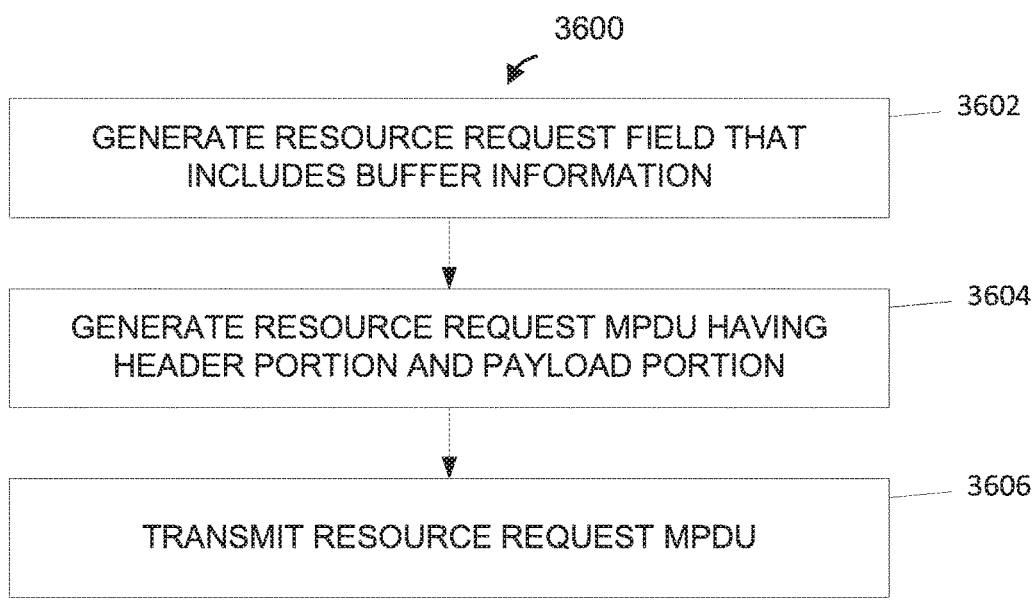
FIG. 36 is a flow diagram of a method for transmitting a resource request for an UL MU transmission, according to an embodiment.

FIG. 36 is a flow diagram of a method 3600 for transmitting a resource request for an UL MU transmission (e.g., UL OFDMA and/or UL MU-MIMO transmission), according to an embodiment. In an embodiment, the method 3600 is implemented by an access point in the WLAN, according to an embodiment. With reference to FIG. 1, the method 3600 is implemented by the network interface device 27, in an embodiment. For example, in one such embodiment, the PHY processor 29 is configured to implement the method 3600. According to another embodiment, the MAC processing 28 is also configured to implement at least a part of the method 3600. With continued reference to FIG. 1, in yet another embodiment, the method 3600 is implemented by the network interface device 16 (e.g., the PHY processor 20 and/or the MAC processor 18). In other embodiments, the method 3600 is implemented by other suitable network interfaces.

At block 3602, a resource request field that includes buffer information corresponding to media access control (MAC) protocol data units (MPDUs) that are queued for transmission by a first communication device (e.g., "queued MPDUs") is generated by the first communication device, in an embodiment. The buffer information indicates a number of bytes for the queued MPDUs. In an embodiment, the first communication device is the client station 25 and the resource request field is the resource request field 3302. In an embodiment, the resource request field includes a resource format indicator that indicates a resource request type and format for the buffer information. For example, the resource format indicator is the resource request format indicator 3402.

At block 3604, a resource request MPDU having i) a header portion, and ii) a payload portion that includes the resource request field is generated by the first communication device. In an embodiment, the resource request MPDU is the MPDU 3300, the header portion corresponds to the fields 804, 810, and 812, and the payload portion corresponds to the resource request 3302.

In an embodiment, generating the resource request MPDU includes generating the payload portion to include a wrapped MPDU field having i) a wrapped type subfield that indicates a frame type of a wrapped MPDU, and ii) a wrapped payload subfield that includes a payload for the wrapped MPDU. In this embodiment, the resource format indicator indicates that the wrapped MPDU is included in the resource request MPDU. For example, the resource request format indicator 3402 indicates that a wrapped type subfield 830 and wrapped payload subfield 832 are included in the payload portion.

In some embodiments, the resource format indicator indicates that the buffer information is for a particular TID and generating the payload portion includes generating the payload portion to include i) a resource subfield that indicates the number of bytes for the queued MPDUs for the particular TID, and ii) a TID subfield that indicates the particular TID. For example, the payload portion includes the TID subfield 3108 and the TID buffer status report 3110.

In some embodiments, the resource format indicator indicates that the buffer information is for a plurality of TIDs and generating the payload portion includes i) generating the payload portion to include a report count indicator subfield that indicates a number of the plurality of TIDs, and ii) generating the payload portion to include, for each of the plurality of TIDs, a respective TID subfield that indicates the TID and a respective resource subfield that indicates the number of bytes for the queued MPDUs for the corresponding TID. In an embodiment, the report count indicator subfield corresponds to the report count indicator subfield 3406, the TID subfield corresponds to the TID subfield 3108, and the resource subfield corresponds to the TID buffer status report 3110.

In some embodiments, the resource format indicator indicates that the buffer information is for an aggregate of TIDs and generating the payload portion includes generating the payload portion to include a resource subfield that indicates a combined number of bytes for the queued MPDUs for a plurality of TIDs. For example, the resource subfield corresponds to the aggregate buffer status report 3432.

In some embodiments, the resource format indicator indicates that the buffer information is for both a particular TID and an aggregate of TIDs, and generating the payload portion includes generating the payload portion to include a TID subfield that indicates a particular TID, a first resource subfield that indicates the number of bytes for the queued MPDUs for the particular TID, and an aggregate subfield that indicates a combined number of bytes for the queued MPDUs for a plurality of TIDs. For example, the TID subfield corresponds to the TID subfield 3442, the first resource subfield corresponds to the TID buffer status report 3444, and the aggregate subfield corresponds to the aggregate buffer status report 3446.

At block 3606, the resource request MPDU is transmitted by the first communication device to a second communication device via a wireless communication channel to request an allocation of radio resources for the UL MU transmission by the second communication device, in an embodiment. The second communication device corresponds to the AP 14, in an embodiment.

Figure 37:
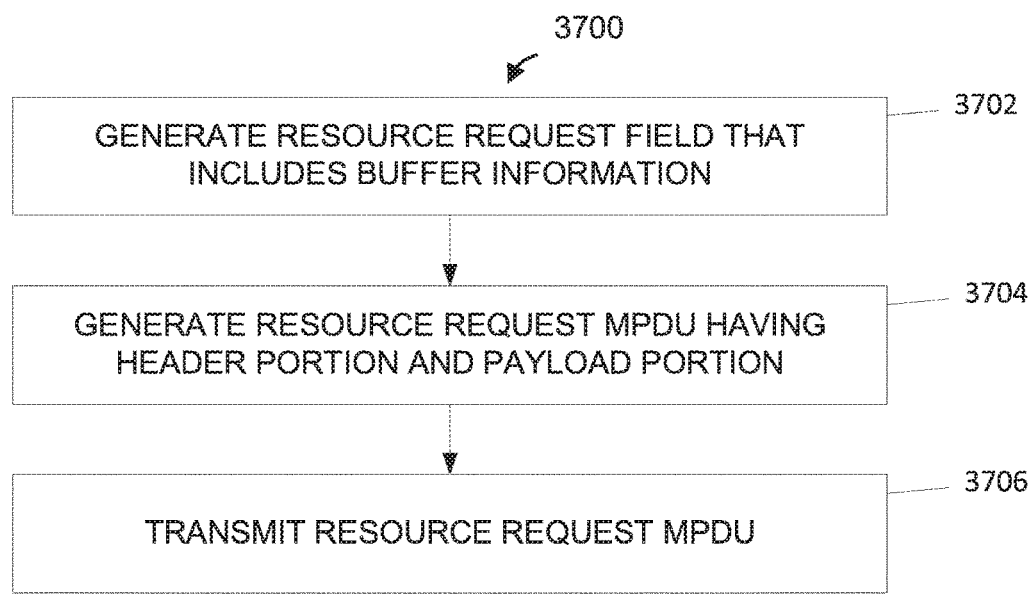
FIG. 37 is a flow diagram of a method for transmitting a resource request for an UL MU transmission, according to an embodiment.

FIG. 37 is a flow diagram of a method 3700 for transmitting a resource request for an UL MU transmission (e.g., UL OFDMA and/or UL MU-MIMO transmission), according to an embodiment. In an embodiment, the method 3700 is implemented by an access point in the WLAN, according to an embodiment. With reference to FIG. 1, the method 3700 is implemented by the network interface device 27, in an embodiment. For example, in one such embodiment, the PHY processor 29 is configured to implement the method 3700. According to another embodiment, the MAC processing 28 is also configured to implement at least a part of the method 3700. With continued reference to FIG. 1, in yet another embodiment, the method 3700 is implemented by the network interface device 16 (e.g., the PHY processor 20 and/or the MAC processor 18). In other embodiments, the method 3700 is implemented by other suitable network interfaces.

At block 3702, a QoS Control field that includes buffer information and a TID value that correspond to media access control (MAC) protocol data units (MPDUs) queued for transmission by a first communication device is generated by the first communication device. In an embodiment, the first communication device is the client station 25 and the QoS Control field is the QoS Control field 2500.

At block 3704, a resource request MPDU that includes the QoS Control field is generated by the first communication device. For example, the client station 25 generates the MPDU 700 to include the QoS Control field 2500 (i.e., in place of the QoS control field 714).

At block 3706, the resource request MPDU is transmitted by the first communication device to a second communication device via a wireless communication channel to request an allocation of radio resources for the UL MU transmission by the second communication device. For example, the client station 25 transmits the MPDU 700 to the AP 14 (e.g., along with transmissions by other client stations for the UL MU transmission).

In some embodiments, the resource request MPDU is a first QoS null MPDU and the first communication device generates an aggregate MPDU (A-MPDU) that includes the first QoS null MPDU and a second QoS null MPDU. In an embodiment, the second QoS null MPDU includes the QoS Control field 2500, the first QoS null MPDU corresponds to a first data group, and the second QoS null MPDU corresponds to a second data group that is different from the first data group.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for transmitting a resource request for an uplink (UL) multi-user (MU) transmission, the method comprising:
generating, by a first communication device, a High Throughput (HT) Control field that includes buffer information corresponding to media access control (MAC) protocol data units (MPDUs) that are queued for transmission by the first communication device, wherein the buffer information indicates a number of bytes for the MPDUs that are queued for transmission, wherein the buffer information includes i) a first group identifier subfield that indicates a particular data group, ii) a first resource subfield configured to indicate the number of bytes for the MPDUs that are queued for transmission for the particular data group, and iii) an aggregate subfield configured to indicate a combined number of bytes for the MPDUs that are queued for transmission for a plurality of data groups;
generating, by the first communication device, a resource request MPDU that includes the HT Control field; and
transmitting, by the first communication device, the resource request MPDU to a second communication device via a wireless communication channel to request an allocation of radio resources for the UL MU transmission by the second communication device.

2. The method of claim 1, wherein the HT Control field is a high efficiency (HE) variant HT Control field.

3. The method of claim 2, wherein the HE variant HT Control field includes i) a control ID subfield that indicates that the HE variant HT Control field includes the buffer information, and ii) a status report subfield that indicates the number of bytes for the MPDUs that are queued for transmission.

4. The method of claim 3, wherein:
the control ID subfield is a first control ID subfield for a first buffer report;
the status report subfield is a first status report subfield for the first buffer report;
the HE variant HT Control field includes
i) a second control ID subfield for a second buffer report, and
ii) a second status report subfield for the second buffer report;
the first buffer report provides different buffer information than the second buffer report.

5. The method of claim 1, wherein:
the buffer information includes i) a scale factor subfield that indicates a scale value, and ii) the first resource subfield indicates a base resource value; and
the number of bytes for the MPDUs that are queued for transmission for the particular data group corresponds to a number of bytes indicated by the scale value multiplied by the base resource value.

6. The method of claim 1, wherein:
the first group identifier subfield indicates a particular traffic identifier (TID).

7. The method of claim 1, wherein:
i) the first group identifier subfield indicates a particular traffic identifier (TID), ii) the first resource subfield indicates a base resource value for the particular TID, iii) the buffer information includes a scale factor subfield that indicates a scale value, and iv) the number of bytes for the MPDUs that are queued for transmission for the particular TID corresponds to a number of bytes indicated by the scale value multiplied by the base resource value.

8. The method of claim 1, wherein:
the method further comprises receiving a downlink (DU) data MPDU that is included within a DL MU physical layer protocol data unit (PPDU);
generating the resource request MPDU comprises generating the resource request MPDU to include the HT control field and an acknowledgment to the DU data MPDU.

9. The method of claim 1, wherein:
the method further comprises receiving a downlink scheduling frame that is included within a DL MU physical layer protocol data unit (PPDU);
generating the resource request MPDU comprises generating the resource request MPDU in response to the downlink scheduling frame.

10. The method of claim 1, wherein the particular data group indicated by the first group identifier is a particular access category.

11. The method of claim 10, wherein:
the buffer information includes a scale factor subfield that indicates a scale value;
the first resource subfield indicates a base resource value for the particular access category; and
the number of bytes for the MPDUs that are queued for transmission for the particular access category corresponds to a number of bytes indicated by the scale value multiplied by the base resource value.

12. A first communication device for transmitting a resource request for an uplink (UL) multi-user (MU) transmission, the first communication device comprising:
a network interface device having one or more integrated circuits configured to
generate a High Throughput (HT) Control field that includes buffer information corresponding to media access control (MAC) protocol data units (MPDUs) that are queued for transmission by the first communication device, wherein the buffer information indicates a number of bytes for the MPDUs that are queued for transmission, wherein the buffer information includes i) a first group identifier subfield that indicates a particular data group, ii) a first resource subfield that indicates the number of bytes for the MPDUs that are queued for transmission for the particular data group, and iii) an aggregate subfield that indicates a combined number of bytes for the MPDUs that are queued for transmission for a plurality of data groups, generate a resource request MPDU that includes the HT Control field, and transmit the resource request MPDU to a second communication device via a wireless communication channel to request an allocation of radio resources for the UL MU transmission by the second communication device.

13. The first communication device of claim 12, wherein the HT Control field is a high efficiency (HE) variant HT Control field.

14. The first communication device of claim 13, wherein the HE variant HT Control field includes i) a control ID subfield that indicates that the HE variant HT Control field includes the buffer information, and ii) a status report subfield that indicates the number of bytes for the MPDUs that are queued for transmission.

15. The first communication device of claim 14, wherein:
the control ID subfield is a first control ID subfield for a first buffer report;
the status report subfield is a first status report subfield for the first buffer report;
the HE variant HT Control field includes
  i) a second control ID subfield for a second buffer report, and
  ii) a second status report subfield for the second buffer report;
the first buffer report provides different buffer information than the second buffer report.

16. The first communication device of claim 12, wherein:
the buffer information includes i) a scale factor subfield that indicates a scale value, and ii) the first resource subfield indicates a base resource value; and
the number of bytes for the MPDUs that are queued for transmission for the particular data group corresponds to a number of bytes indicated by the scale value multiplied by the base resource value.

17. The first communication device of claim 12, wherein:
the first group identifier subfield indicates a particular traffic identifier (TID).

18. The first communication device of claim 12, wherein:
i) the first group identifier subfield indicates a particular traffic identifier (TID), ii) the first resource subfield indicates a base resource value for the particular TID, iii) the buffer information includes a scale factor subfield that indicates a scale value, and iv) the number of bytes for the MPDUs that are queued for transmission for the particular TID corresponds to a number of bytes indicated by the scale value multiplied by the base resource value.

19. The first communication device of claim 12, wherein the particular data group indicated by the first group identifier is a particular access category.

20. The first communication device of claim 19, wherein:
the buffer information includes a scale factor subfield that indicates a scale value;
the first resource subfield indicates a base resource value for the particular access category; and
the number of bytes for the MPDUs that are queued for transmission for the particular access category corresponds to a number of bytes indicated by the scale value multiplied by the base resource value.

21. A method for transmitting a resource request for an uplink (UL) multi-user (MU) transmission, the method comprising:
generating, by a first communication device, a resource request field that includes buffer information corresponding to media access control (MAC) protocol data units (MPDUs) that are queued for transmission by the first communication device, wherein the buffer information indicates a number of bytes for the MPDUs that are queued for transmission, wherein the buffer information includes i) a first group identifier subfield that indicates a particular data group, ii) a first resource subfield configured to indicate the number of bytes for the MPDUs that are queued for transmission for the particular data group, and iii) an aggregate subfield configured to indicate a combined number of bytes for the MPDUs that are queued for transmission for a plurality of data groups;

generating, by the first communication device, a resource request MPDU having i) a header portion, and ii) a payload portion that includes the resource request field; and transmitting, by the first communication device, the resource request MPDU to a second communication device via a wireless communication channel to request an allocation of radio resources for the UL MU transmission by the second communication device.

22. The method of claim 21, wherein the resource request field includes a resource format indicator that indicates a resource request type for the buffer information.

23. The method of claim 22, wherein:
generating the resource request MPDU comprises generating the payload portion to include a wrapped MPDU field having i) a wrapped type subfield that indicates a frame type of a wrapped MPDU, and ii) a wrapped payload subfield that includes a payload for the wrapped MPDU; and
the resource format indicator indicates that the wrapped MPDU is included in the resource request MPDU.

24. The method of claim 22, wherein when the resource format indicator indicates that the buffer information is for a particular traffic identifier (TID), generating the payload portion comprises generating the payload portion to include
a resource subfield that indicates the number of bytes for the MPDUs that are queued for transmission for the particular TID, and
a TID subfield that indicates the particular TID.

25. The method of claim 22, wherein when the resource format indicator indicates that the buffer information is for a plurality of traffic identifiers (TIDs), generating the payload portion comprises generating the payload portion to include
a report count indicator subfield that indicates a number of the plurality of TIDs, and
for each of the plurality of TIDs, a respective TID subfield that indicates the TID and a respective resource subfield that indicates the number of bytes for the MPDUs that are queued for transmission for the corresponding TID.

26. The method of claim 22, wherein when the resource format indicator indicates that the buffer information is for an aggregate of traffic identifiers (TIDs), generating the payload portion comprises generating the payload portion to include
a resource subfield that indicates a combined number of bytes for the MPDUs that are queued for transmission for a plurality of TIDs.

27. The method of claim 22, wherein when the resource format indicator indicates that the buffer information is for both a particular traffic identifier (TID) and an aggregate of TIDs, generating the payload portion comprises generating the payload portion to include
a TID subfield that indicates a particular TID, a first resource subfield that indicates the number of bytes for the MPDUs that are queued for transmission for the particular TID, and an aggregate subfield that indicates a combined number of bytes for the MPDUs that are queued for transmission for a plurality of TIDs.

28. A method for transmitting a resource request for an uplink (UL) multi-user (MU) transmission, the method comprising:

generating, by a first communication device, a QoS Control field that includes buffer information and a TID value that correspond to media access control (MAC) protocol data units (MPDUs) queued for transmission by the first communication device, wherein the buffer information indicates a number of bytes for the queued MPDUs, wherein the buffer information includes i) a first group identifier subfield that indicates a particular data group, ii) a first resource subfield configured to indicate the number of bytes for the MPDUs that are queued for transmission for the particular data group, and iii) an aggregate subfield configured to indicate a combined number of bytes for the MPDUs that are queued for transmission for a plurality of data groups;

generating, by the first communication device, a resource request MPDU that includes the QoS Control field; and transmitting, by the first communication device, the resource request MPDU to a second communication device via a wireless communication channel to request an allocation of radio resources for the UL MU transmission by the second communication device.

29. The method of claim 28, wherein:
the resource request MPDU is a first QoS null MPDU; and
generating the resource request MPDU comprises generating an aggregate MPDU (A-MPDU) that includes the first QoS null MPDU and a second QoS null MPDU.

30. The method of claim 29, wherein the first QoS null MPDU corresponds to a first data group and the second QoS null MPDU corresponds to a second data group that is different from the first data group.

* * * * *